United States Patent [19]
Oguro

[11] Patent Number: 6,097,558
[45] Date of Patent: *Aug. 1, 2000

[54] DIGITAL AUDIO SIGNAL TRANSMISSION APPARATUS WITH DATA BLOCKS OF VARYING SIZES

[75] Inventor: Masaki Oguro, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,147

[22] Filed: May 13, 1997

Related U.S. Application Data

[63] Continuation of application No. 08/409,088, Mar. 22, 1995, abandoned.

[30] Foreign Application Priority Data

Mar. 31, 1994 [JP] Japan ................................ 6-085618
May 20, 1994 [JP] Japan ................................ 6-131375

[51] Int. Cl.[7] ............................................. G11B 5/02
[52] U.S. Cl. ........................ 360/22; 360/48; 369/86; 381/1; 386/97
[58] Field of Search ............................ 369/92, 91, 89, 369/87, 86; 358/335, 343; 360/22, 23, 32, 33.1, 19.1, 35.1, 48; 386/96, 97, 98, 99, 102, 104; 381/1

[56] References Cited

U.S. PATENT DOCUMENTS

| | | | |
|---|---|---|---|
| 5,311,372 | 5/1994 | Matsumi | 360/22 |
| 5,323,273 | 6/1994 | Azuma | 369/86 |
| 5,349,384 | 9/1994 | Oguro | 358/335 |
| 5,392,165 | 2/1995 | Hosono et al. | |
| 5,414,523 | 5/1995 | Azuma | 360/19.1 |
| 5,539,587 | 7/1996 | Sekii | 360/27 |
| 5,541,737 | 7/1996 | Oguro et al. | 360/48 X |
| 5,583,654 | 12/1996 | Oguro | 360/27 |
| 5,592,342 | 1/1997 | Hall et al. | 360/48 |
| 5,615,056 | 3/1997 | Oguro | 386/104 |
| 5,638,451 | 6/1997 | Sedlmeyer | |

FOREIGN PATENT DOCUMENTS

| | | | |
|---|---|---|---|
| 500049 | 8/1992 | European Pat. Off. | 386/96 |
| 0 483 873 A2 | 5/1993 | European Pat. Off. | |
| 0 540 329 A2 | 5/1993 | European Pat. Off. | |
| 572925 | 12/1993 | European Pat. Off. | 386/46 |
| 595558 | 5/1994 | European Pat. Off. | 386/46 |
| 600457 | 6/1994 | European Pat. Off. | 360/15 |
| 600493 | 6/1994 | European Pat. Off. | 386/96 |
| 33 04 796 A1 | 8/1983 | Germany | |
| 42 09 363 A1 | 10/1992 | Germany | |
| 42 22 623 A1 | 1/1994 | Germany | |
| 2117 555 | 10/1983 | United Kingdom | |
| WO 93/14494 | 7/1993 | WIPO | |

*Primary Examiner*—Alan T. Faber
*Attorney, Agent, or Firm*—Frommer Lawrence & Haug, LLP.; William S. Frommer

[57] ABSTRACT

Digital audio signal transmission is provided for digitally processing, for transmission in a digital VCR format, audio signals from a plurality of channels into a digitized audio data segmented into blocks having a data size, each block reserved for audio data digitized from one of the channels. The audio data is converted from the channels into the blocks of digitized audio data by varying the data size of the blocks. The audio data is composed by scaling the audio data in at least one of the blocks and combining the scaled audio data with the audio data of another of the blocks into a block reserved for composite audio data.

22 Claims, 28 Drawing Sheets

| WORD NAME | MSB                LSB |
|---|---|
| PC0 | HEADER |
| PC1 | |
| PC2 | DATA |
| PC3 | |
| PC4 | |

Fig. 8A

| PC0 | 0 | 1 | 0 | 1 | 0 | 0 | 0 | 0 |
|-----|---|---|---|---|---|---|---|---|
| PC1 | LF | 1 | AF SIZE ||||||
| PC2 | CH ||| PA | AUDIO MODE ||||
| PC3 | MIX | ML | 50/60 | STYPE |||||
| PC4 | EF | TC | SMP ||| QU |||

Fig. 8B

| CH | AUDIO CHANNEL MODE |
|-----|--------------------|
| 000 | 2CH AUDIO |
| 001 | 4CH AUDIO |
| 010 | 8CH AUDIO |
| 011 | LUMPED 8CH AUDIO |
| OTHER | RESERVED |

PRE-SYNC BLOCK

POST-SYNC BLOCK

| PACK NUMBER \ TRACK NUMBER | 1 | 2 | 3 | 4 | 5 | 6 | 7 | 8 | 9 | 10 |
|---|---|---|---|---|---|---|---|---|---|---|
| 8 | 55 | f | 55 | | 55 | | 55 | | 55 | |
| 7 | 54 | e | 54 | | 54 | | 54 | | 54 | |
| 6 | 53 | d | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 | | 52 | | 52 | | 52 | | 52 |
| 1 | b | 51 | h | 51 | | 51 | | 51 | | 51 |
| 0 | a | 50 | g | 50 | | 50 | | 50 | | 50 |

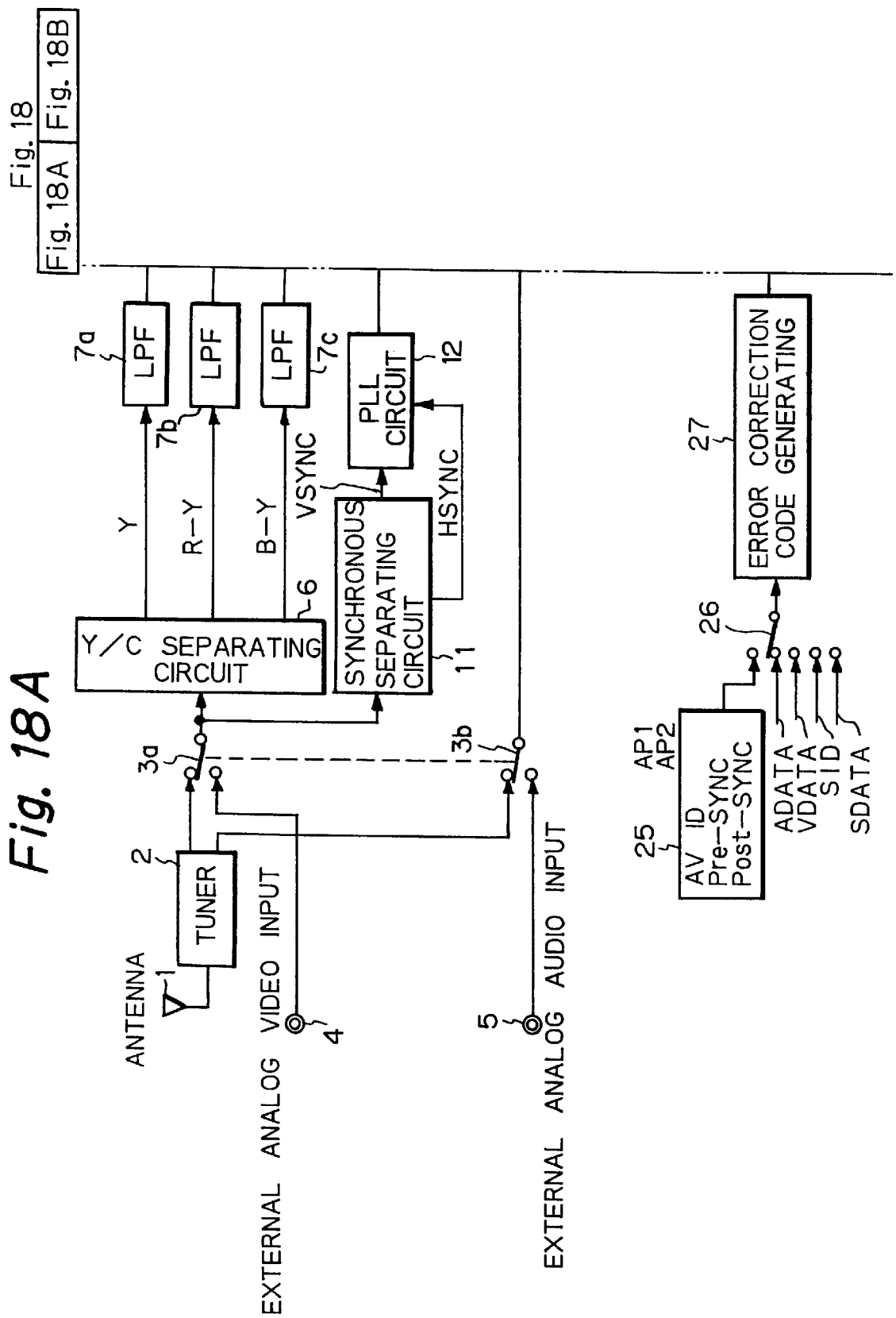

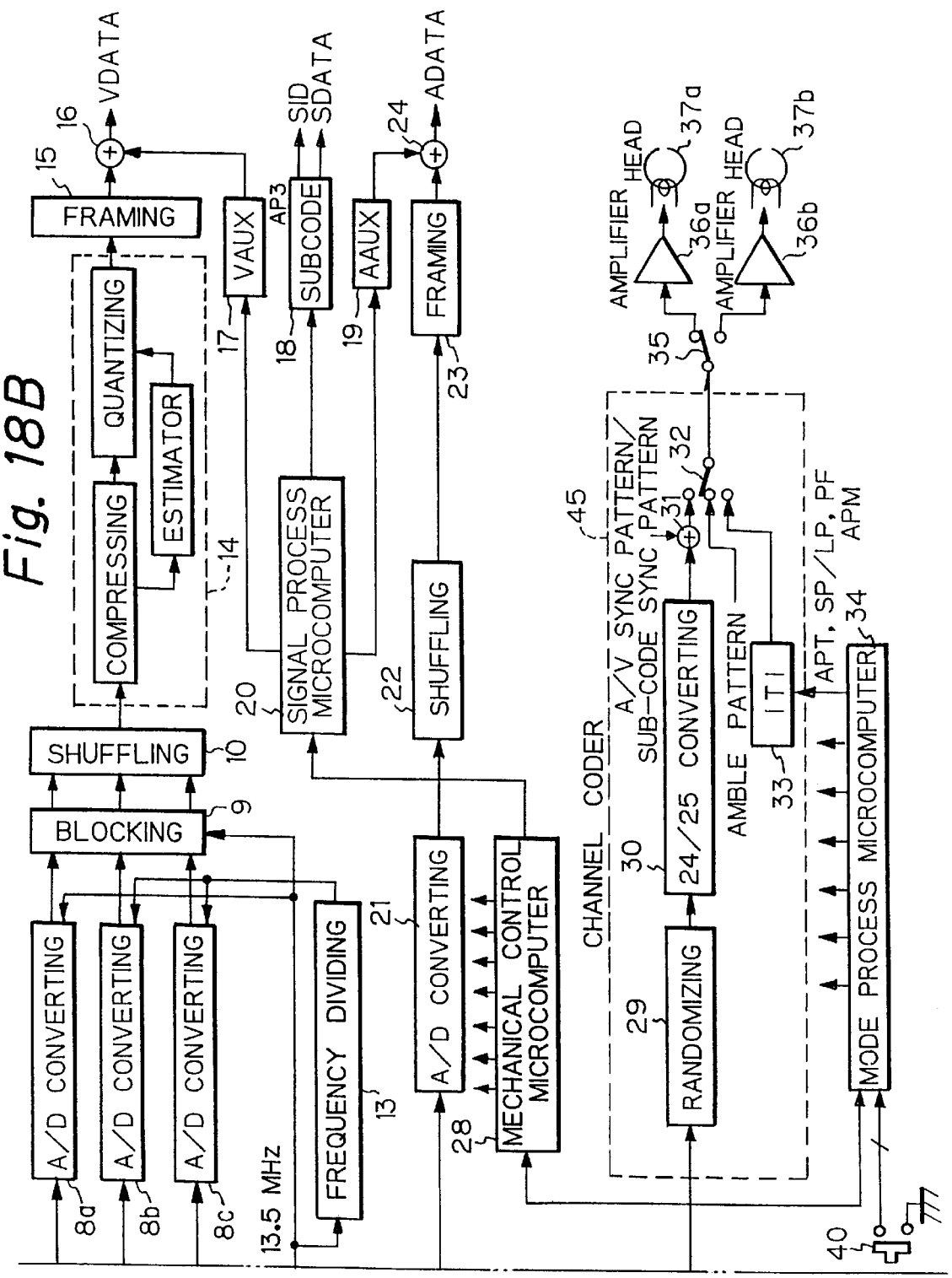

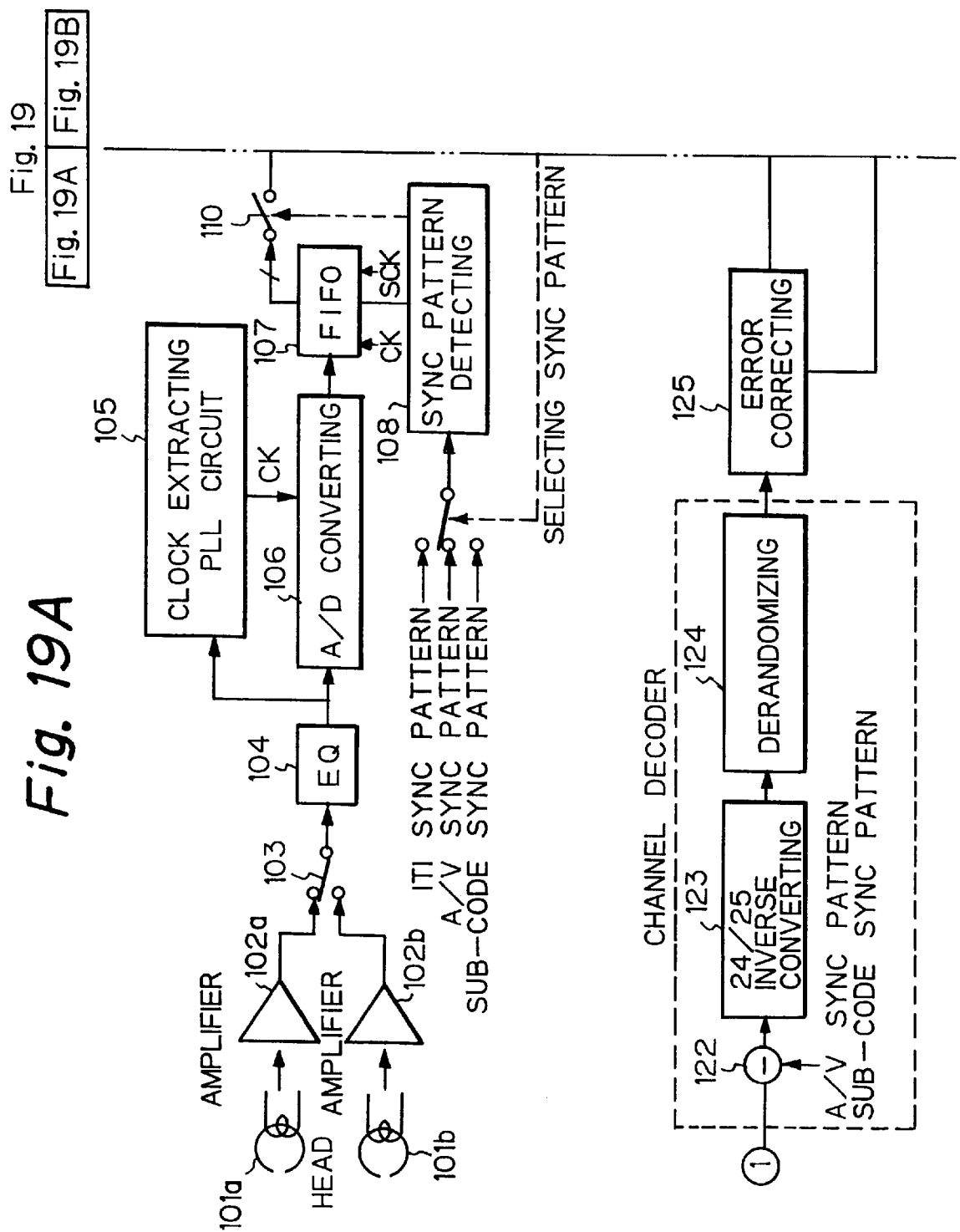

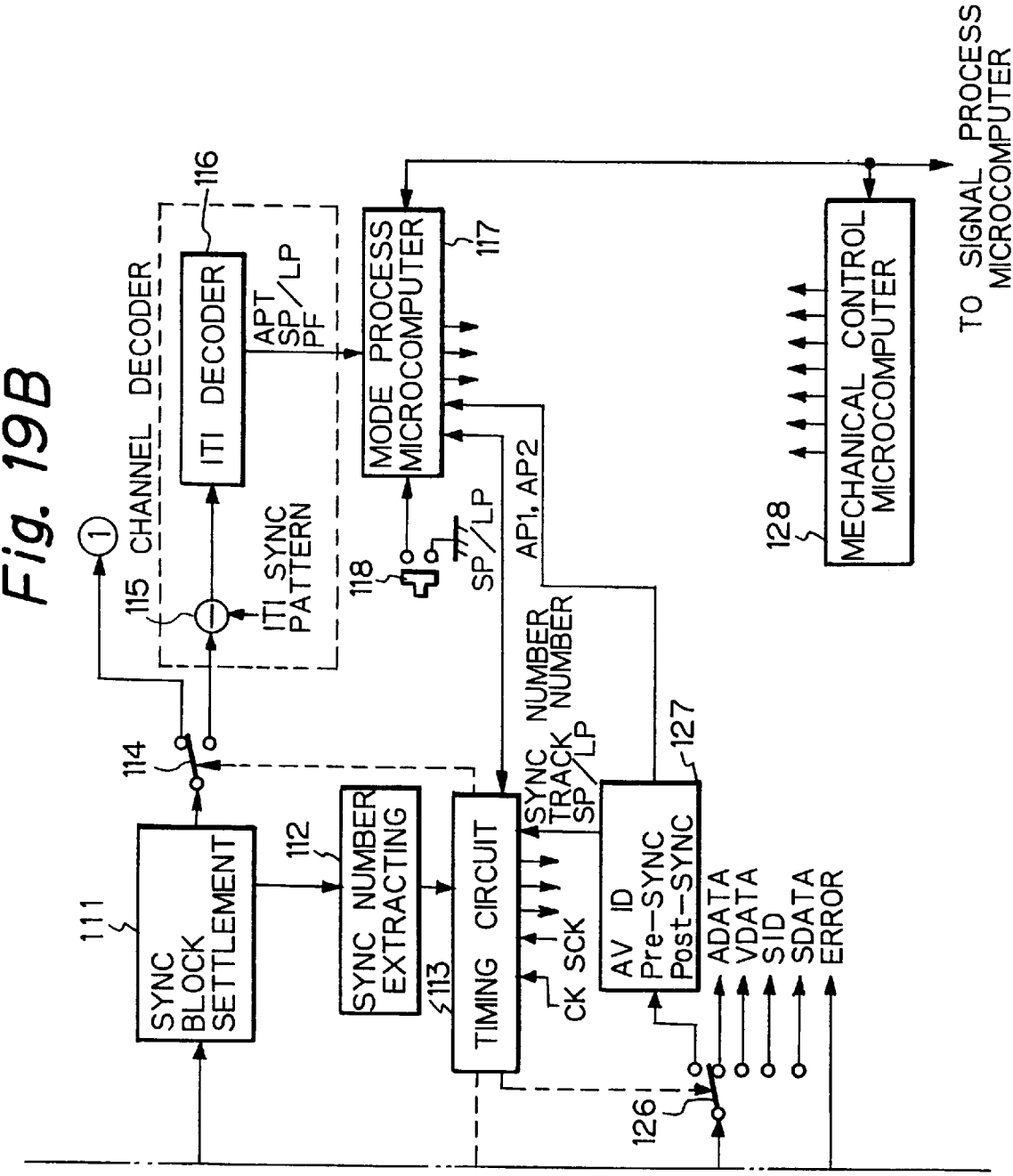

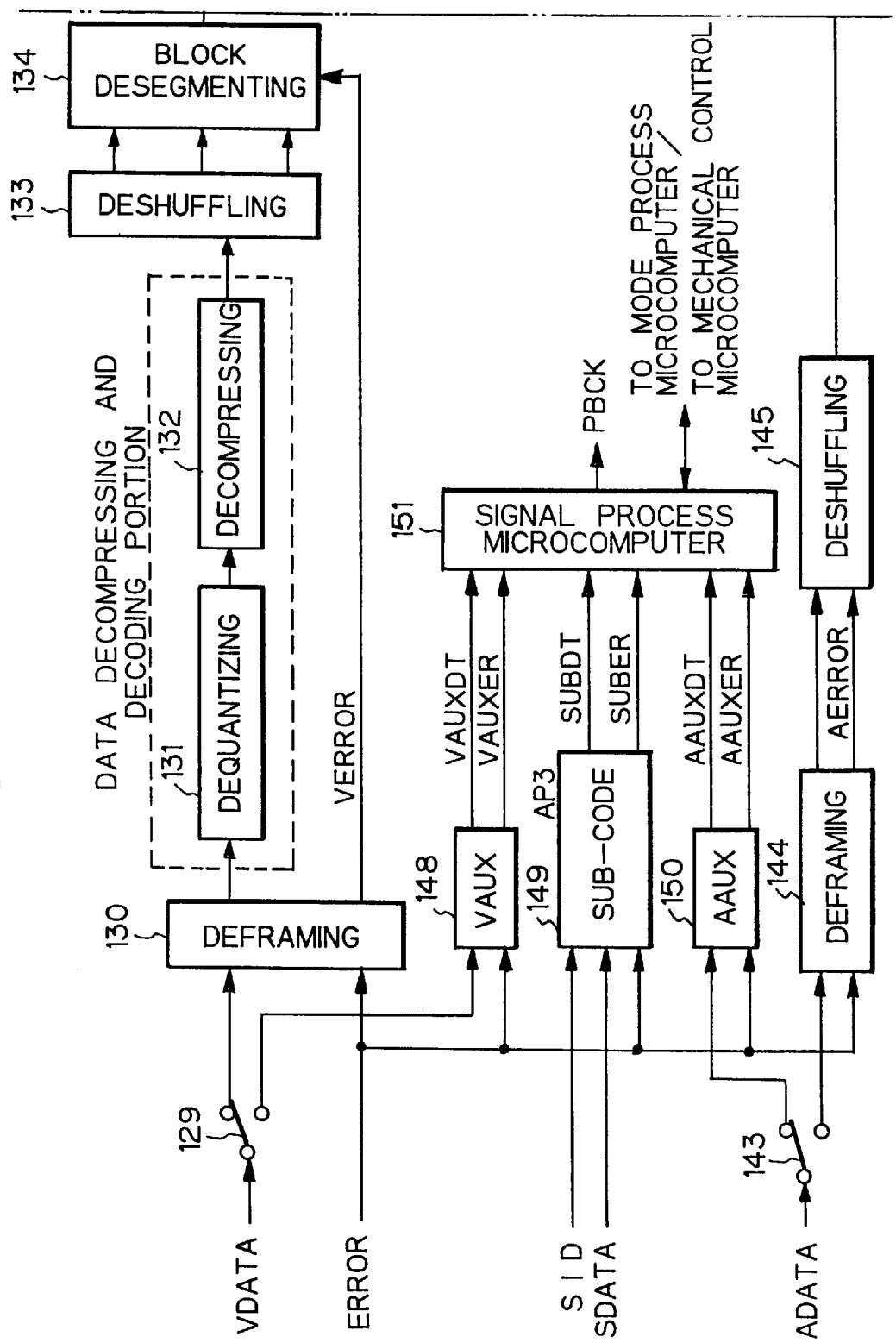

Fig. 21A

HD AUDIO
48 KHz, 44.1 KHz, 32 KHz, 16-BIT, 4-CHANNEL MODE

| 5 TRACKS | 5 TRACKS | 5 TRACKS | 5 TRACKS |
|---|---|---|---|
| CH1 | CH2 | CH3 | CH4 |
| 16 BITS | 16 BITS | 16 BITS | 16 BITS |

Fig. 21B

32 KHz, 12-BIT, 8-CHANNEL MODE

| 5 TRACKS | 5 TRACKS | 5 TRACKS | 5 TRACKS | 5 TRACKS | 5 TRACKS | 5 TRACKS | 5 TRACKS |
|---|---|---|---|---|---|---|---|
| CH1 | CH2 | CH3 | CH4 | CH5 | CH6 | CH7 | CH8 |
| 12 BITS | 12 BITS | 12 BITS | 12 BITS | 12 BITS | 12 BITS | 12 BITS | 12 BITS |

Fig. 21C

SD AUDIO
48 KHz, 44.1 KHz, 32 KHz, 16-BIT, 2-CHANNEL MODE

| 5 TRACKS | 5 TRACKS |
|---|---|
| CH1 | CH2 |
| 16 BITS | 16 BITS |

Fig. 21D

32 KHz, 12-BIT, 4-CHANNEL MODE

| 5 TRACKS | 5 TRACKS | 5 TRACKS | 5 TRACKS |
|---|---|---|---|
| CH1 | CH2 | CH3 | CH4 |
| 12 BITS | 12 BITS | 12 BITS | 12 BITS |

BUSINESS-USE 20-BIT MODE

HD 3CH MODE

SD 1CH MODE

SD2ch

Fig. 24C
COMBINATION FOR STEREO

| L | R | BLANK | BLANK | |
|---|---|---|---|---|
| L | R | L | R | 2-WAY STEREO |
| L | R | C | S | 3/1 STEREO |
| L | R | C | BLANK | 3/0 STEREO |
| L | R | S | BLANK | 2/1 STEREO |
| L | R | Ls | Rs | 2/2 STEREO |

Fig. 24B
COMBINATION FOR STEREO AND MONAURAL

| L | R | M | BLANK |
|---|---|---|---|
| L | R | M | M |
| M | M | L | R |
| M | BLANK | L | R |
| L | R | C | M |

Fig. 24A
SD4ch, HD4ch COMBINATION FOR MONAURAL

| M | BLANK | BLANK | BLANK |
|---|---|---|---|
| M | M | BLANK | BLANK |
| M | BLANK | M | BLANK |
| M | BLANK | BLANK | M |
| M | M | M | BLANK |
| M | M | BLANK | M |
| M | BLANK | M | M |
| M | M | M | M |

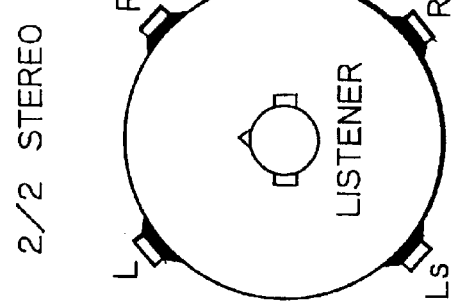
Fig. 25A  3/0 STEREO
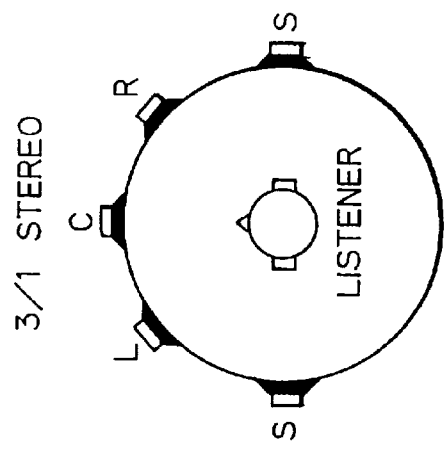
Fig. 25B  3/1 STEREO
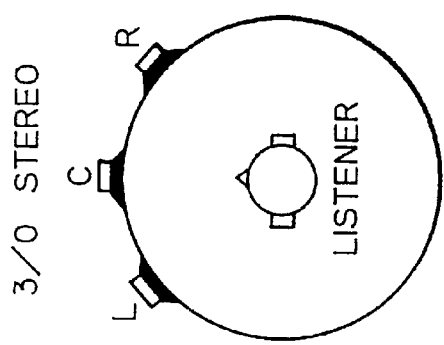
Fig. 25C  2/2 STEREO
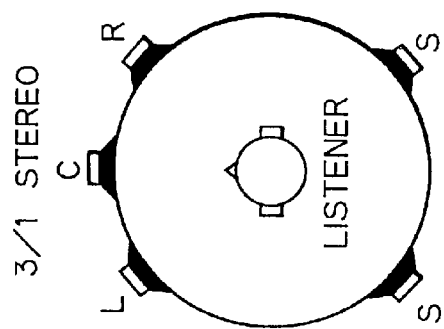
Fig. 25D  3/1 STEREO

MOVIE-THEATER-TYPE 8-/6-CHANNEL STEREO

| | | | | | | | |
|---|---|---|---|---|---|---|---|
| L | R | BLANK BLANK | Ls₁ | Rs₁ | Ls₂ | Rs₂ | |

Fig. 28A  2/4 STEREO

| | | | | | | |
|---|---|---|---|---|---|---|
| L | R | C | WO | Ls | Rs | BLANK BLANK |

Fig. 28B  3/2 STEREO + WO (6-CH STEREO)

| | | | | | | |
|---|---|---|---|---|---|---|
| L | R | C | WO | Ls | Rs | LC | RC |

Fig. 28C  5/2 STEREO + WO (8-CH STEREO)

EXAMPLES OF SD 4CH AND HD 4CH

| | | |
|---|---|---|
| M | M | M/MIX |

Fig. 29A

| | | |
|---|---|---|
| L | R | M/MIX BLANK |

Fig. 29B

| | | |
|---|---|---|
| L | R | M M/MIX |

Fig. 29C

| | | |
|---|---|---|
| L | R | C | M/MIX |

Fig. 29D

3/2 STEREO + WO

|         | L      | R      | C      | LS     | RS      |
|---------|--------|--------|--------|--------|---------|
| L MIX = | 1.0000 | 0.0000 | 0.7071 | 0.7071 | 0.0000  |
| R MIX = | 0.0000 | 1.0000 | 0.7071 | 0.0000 | 0.7071  |
| T     = | 0.0000 | 0.0000 | 0.7071 | 0.0000 | 0.0000  |
| Q1    = | 0.0000 | 0.0000 | 0.0000 | 0.7071 | 0.7071  |
| Q2    = | 0.0000 | 0.0000 | 0.0000 | 0.7071 | -0.7071 |

|      | L MIX  | R MIX  | T       | Q1     | Q2      |
|------|--------|--------|---------|--------|---------|
| L  = | 1.0000 | 0.0000 | -1.0000 | -0.500 | -0.500  |
| R  = | 0.0000 | 1.0000 | -1.0000 | 0.500  | -0.500  |
| C  = | 0.0000 | 0.0000 | 1.4142  | 0.0000 | 0.0000  |
| LS = | 0.0000 | 0.0000 | 0.0000  | 0.7071 | 0.7071  |
| RS = | 0.0000 | 0.0000 | 0.0000  | 0.7071 | -0.7071 | ns
DIGITAL AUDIO SIGNAL TRANSMISSION APPARATUS WITH DATA BLOCKS OF VARYING SIZES

This application is a continuation of application Ser. No. 08/409,088, filed on Mar. 22, 1995 now abandoned.

BACKGROUND OF THE INVENTION

1. Field of the Invention

The present invention relates to a digital audio signal transmission apparatus, more particularly, to a process for multiple-channel audio signals for use with an apparatus for recording and reproducing digital audio signals.

Audio apparatuses with surround reproducing systems that provide sound effects have been disclosed and sold. The surround reproducing systems with four speakers (for example, two-front-and-two-rear-speaker system and three-front-and-one-rear-speaker system) are known. In the field of movies, this tendency is much drastic. Analog surround systems are being replaced with digital surround systems. Six-channel surround systems and eight-channel surround systems have been proposed.

U.S. Pat. No. 5,349,384 and EP laid-open publication Nos. 0600467, 0600493 by the same applicant as related arts (U.S. patent applications having the respective Ser. Nos. 08/159,238 now 08/480,934 and 08/159,455, corresponding to the above two publications are pending).

When a movie video tape is sold as a video soft tape, the surround signals recorded on the tape may be partially changed or may be not changed. However, most users have only two-channel stereo reproducing systems using two speakers. Thus, although the video soft tape records the surround signals, most users cannot fully reproduce them. In addition, when only left and right components of sound signals are output, important audio information such as speech portion may be lost.

When a reproducing apparatus such as a digital VCR reproduces audio signals on a plurality of channels from a video soft tape, the audio signals of the plurality of channels should be composited as conventional L and R components and then the resultant signals should be output. Thus, the hardware for processing audio signals of the digital VCR becomes complicated.

When manufacturers of video soft tapes convert surround signals into two-channel stereo signals, the hardware of the VCR does not increase. However, the value of the of the video soft tapes is deteriorated. Thus, this method is not preferable for the manufacturers of the video soft tapes.

OBJECTS AND SUMMARY OF THE INVENTION

It is, therefore, an object of the present invention is to provide a digital audio signal transmission apparatus for recording and reproducing audio signals in multi-channel stereo format and for reproducing audio signals in conventional two-channel stereo format without need to increase the load of a reproducing apparatus.

According to an aspect of the invention, there is provided a digital audio signal transmission apparatus for digitizing analog audio signals on a plurality of channels and transmitting the resultant digital audio signals or for transmitting digital audio signals on a plurality of channels, comprising a means for converting the digital audio signals into a format having independent audio data storage areas for the channels, and a means for composite audio data on each channel corresponding to a predetermined composite ratio and storing the composite audio data along with the original data on each channel when the audio data on each channel correlates with each other.

According to another aspect of the invention, there is provided a digital audio signal transmission apparatus for digitizing analog audio signals on a plurality of channels and transmitting the resultant digital audio signals or for transmitting digital audio signals on a plurality of channels, wherein the digital audio signals are converted into a format having independent audio data storage areas for the channels and additional data storage areas such as audio mode, wherein audio data on each channel is composited corresponding to a predetermined composite ratio and the composite audio data is stored along with the original data on each channel when the audio data on each channel correlates with each other, and wherein an audio mode and a storage area are determined corresponding to additional data when the digital audio signals are received or a connection state is automatically determined corresponding to a user setting, and a stereo output on a plurality of channels or the output of the composite audio data are automatically selected.

According to further aspect of the invention, there is provided a digital audio signal transmission apparatus, wherein an error that takes place in audio data on each channel is corrected.

According to the above-described construction, sound data that has recorded as surround signals can be output as conventional stereo sound or the like without need to composing the sound data with analog signals or digital signals. Thus, it is not necessary to provide a receiving apparatus such as a receiving VCR for such a circuit. In addition, since a desired sound can be reproduced without need to perform complicate calculations and mixing signals, a mixing error does not take place. If an error takes place, by inversely calculating the audio data on the remaining channels, the components on the channel of which the error takes place can be restored.

According to the present invention, from a multiple-channel stereo video soft tape, conventional two-channel stereo audio signals can be reproduced without need to increase the cost of VCRs. This also applies to the monaural VCRs. In this case, even if there are stereo mix sounds, monaural sounds can be easily composited by simply adding the stereo mix sounds. In addition, when there are record areas for eight channels, five-channel stereo signals and three-channel stereo signals can be simultaneously recorded as a modified application. When stereo mix audio signals and multiple-channel stereo signals are automatically selected corresponding to the connection state of the output, the user does not need to perform a troublesome operation.

The above, and other, objects, features and advantage of the present invention will become readily apparent from the following detailed description thereof which is to be read in connection with the accompanying drawings.

BRIEF DESCRIPTION OF THE DRAWINGS

FIGS. 8A and 8B are schematic diagrams showing a data structure of a pack;

FIGS. 18A and 18B are schematic diagram showing a recording system of a digital VCR;

FIGS. 19A and 19B are block diagrams showing a part of a reproducing system of a digital VCR;

FIGS. 20A and 20B are block diagrams showing another part of a reproducing system of a digital VCR;

FIGS. 21A–D are schematic diagrams showing a record format of a digital audio signal of a digital VCR;

FIGS. 24A–C are schematic diagrams showing record examples of SD 4ch and HD 4ch formats;

FIGS. 25A–D are schematic diagrams showing layouts of speakers in multiple-channel stereo systems;

FIGS. 28A–C are schematic diagrams showing some examples of multiple-channel stereo systems in HD 8ch format;

FIGS. 29A–D are schematic diagrams showing some examples of SD 4CH and HD 4-CH record formats according to the present invention;

DETAILED DESCRIPTION OF THE PREFERRED EMBODIMENTS

Next, with reference to the accompanying drawings, a preferred embodiment of the present invention will be described. In the embodiment, the present invention is applied to a digital VCR (video cassette tape recorder) that compresses digital video signals and recording and reproducing the signals to and from a tape. However, it should be noted that the present invention can be applied to a recording/reproducing apparatus that uses another recording medium such as an optical disc. Moreover, it should be noted that the present invention is not limited to the recording/reproducing apparatus. Instead, the present invention can be applied to a system that transmits digital audio signals through a digital communication line.

An example of a digital VCR will be described. In a digital VCR that compresses digital video data for recording and reproducing it, composite digital color video data is separated into a luminance signal Y and color difference signals (R−Y) and (B−Y). The separated signals are compressed corresponding to highly efficient compressing technique using highly efficient code corresponding to DCT transform technique and variable length encoding technique. The compressed signals are recorded on a magnetic tape through a rotating head. There are two recording systems that are SD system (525 lines/60 Hz, 652 lines/50 Hz) and HD system (1125 lines/60 Hz, 1250 lines/50 Hz).

In the SD system, the number of tracks per frame is 10 (in the case of 525 lines/60 Hz) or 12 (in the case of 525 lines/50 Hz). In the HD system, the number of tracks per frame is twice as many as that in the SD system. In other words, the number of tracks per frame is 20 (in the case of 1125 lines/60 Hz) or 24 (1250 lines/50 Hz).

For such a digital VCR, as a system in which data can be easily managed and that can be used as a general-purpose recording/reproducing apparatus, the applicant of the present invention has proposed a system referred to as an application ID. When this system is used, a cassette having a VAUX (Video Auxiliary Data), an AAUX (Audio Auxiliary Data), a sub-code, and an MIC (Memory In Cassette) can be easily managed. Using a pack, after-recording of video data, insertion of video data, and recording of data (such as management signals for broadcasting stations and medical signals) superimposed in a vertical blanking interval are performed.

Figure 1:
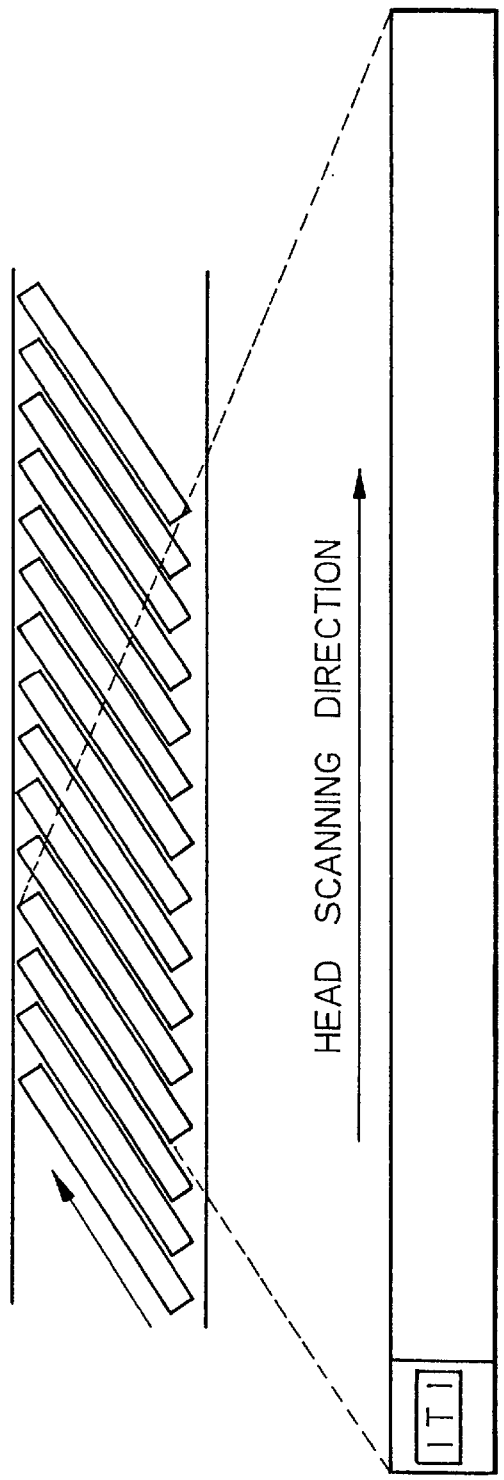
FIGS. 1A and 1B are schematic diagrams showing a track format of a tape.

Next, the application ID system will be described. On a tape for use with the digital VCR according to the present invention, as shown in FIG. 1A, oblique tracks are formed. In the case of the SD system, the number of tracks per frame is 10 or 12. In the case of the HD system, the number of track per frame is 20 or 24. FIG. 1B shows a track on the tape for use with the digital VCR. On the track entering side, a timing block is formed so as to securely perform an after-recording operation. This timing block is referred to as an ITI (Insert and Track Information). The ITI is used to precisely align an area of data that is rewritten by the after-recording operation.

In any digital data recording/reproducing apparatus, data of a particular area should be rewritten. Thus, the ITI area on the track entering side should be always formed. In the ITI area, a large number of sync blocks with a short sync length are written. The sync blocks are assigned sync numbers successively from the track entering side. In performing the after-recording operation, when any sync block is detected, the position on the current track can be precisely determined. Thus, the area of the after-recording operation is defined corresponding to the position on the current track. Generally, due to the mechanical accuracy of the head or the like, since the head cannot stably contact the track entering side, the sync length is shortened and many sync blocks are written so as to raise the detecting probability.

Figure 2:
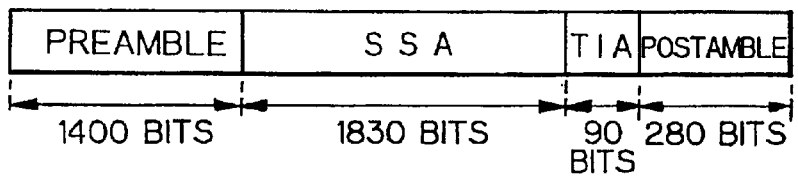
FIG. 2 is a schematic diagram showing a track format of a tape.

As shown in FIG. 2, the ITI area is composed of four portions that are a preamble, an SSA, a TIA, and a post-amble. The preamble has 1400 bits and functions as a run-in of a PLL for reproducing digital data. The SSA (Start Sync Block Area) is used for the function of the ITI and composed of 61 blocks, each of which has 30 bits. The SSA is followed by the TIA (Track Information Area). The TIA is composed of 3 blocks that has a total of 90 bits. The TIA is an area for storing information relating to the entire track. The TIA stores an APT (Application ID of a Track) of three bits, an SP/LP bit (that represents a track pitch), a reserve bit, and a PF (Pilot Frame) (that represents the reference frame of a servo system of one bit). The TIA is followed by the postamble. The postamble is a margin that has 280 bits.

For the above-described apparatus, the applicant of the present invention has proposed a system that is disclosed as EP Application No. 0572925 or 0595558 (corresponding U.S. Pat. Nos. 5,390,870 and 5,481,415 respectively). In the system, a cassette that accommodates a recording medium is provided with a circuit board with a memory IC. When the cassette is mounted on the apparatus, data written in the memory IC is read and the recording and reproducing operations of the apparatus are performed corresponding to the data read from the memory IC. Hereinafter, this system is referred to as an MIC.

In the MIC, TOC (Table Of Contents) information, index information, character information, reproduction control information, and timer record information can be stored as well as tape intrinsic information such as tape length, tape thickness, and tape type. When the cassette tape with the MIC is mounted on a digital VCR, the data stored in the MIC is read. Corresponding to the data read from the MIC, predetermined operations such as skipping of a particular program, setting of reproducing order of programs, and reproducing a still image (photo image) with designating a particular program, and timer recording operation can be performed.

The application ID is also stored in the high order three bits of the address 0 of the MIC as an APM (Application ID of MIC) as well as the APT in the TIA area. The application ID defines the data structure. In other words, the application ID defines the data structure of the area rather than the application.

APT . . . defines the data structure of the track.

APM . . . defines the data structure of the MIC.

The data structure of the track is defined corresponding to the value of the APT.

Figure 3:
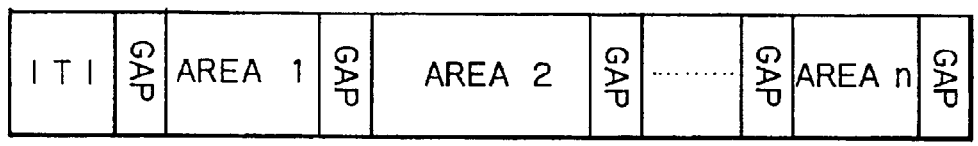
FIG. 3 is a schematic diagram showing a track format of a tape.

In other words, as shown in FIG. 3, the remaining track preceded by the ITI area is divided into several areas. The data structure such as positions of the divided areas on the track, the structure of sync blocks, and the structure of ECC (which protects data against an error) is defined corresponding to the value of the APT. In addition, each area has an application ID that defines the data structure thereof. The application ID has the following definition.

Application ID of area n . . . Defines the data structure of area n.

Figures 4A, 4B:
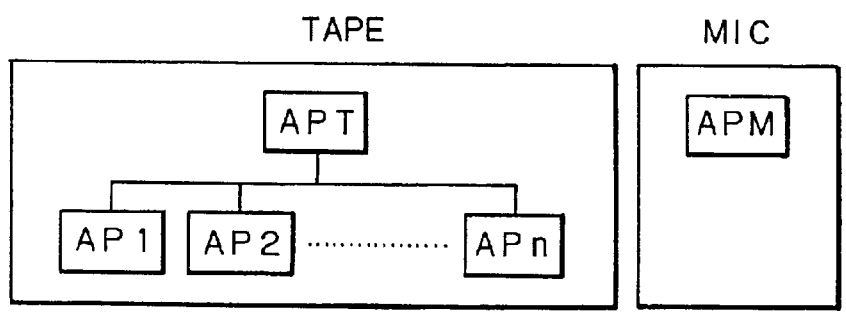
FIGS. 4A,B are schematic diagram showing a hierarchical structure of an application ID.

As shown in FIG. 4A, the application IDs are hierarchically structured. The APT, which is the primary application ID, defines the areas of the track. In each area, AP1 to APn are defined. The number of areas is defined by the APT. In FIG. 4A, the hierarchical levels is two. However, when necessary, the lower hierarchical levels may be provided. The number of hierarchical levels of the APM, which is the application ID in the MIC (FIG. 4B), is one. The same value of the digital VCR is written to the APM.

With the application ID system, the cassette, mechanism, servo system, ITI area generating/detecting circuit, and so forth of the home-use digital VCR can be used as a completely different product such as a data streamer or a multiple-track digital tape recorder. In addition, the content of one area that has been predetermined can be defined corresponding to the application ID thereof. Depending on the value of the application ID, a variety of data (such as video data, video data+audio data, and computer data) can be designated.

Figure 5A:
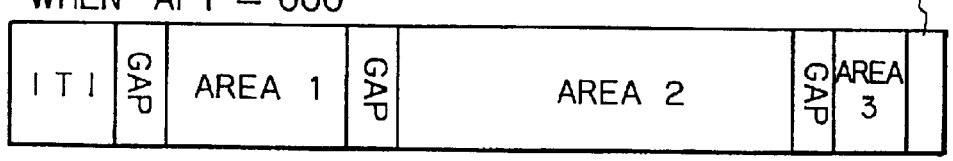
FIGS. 5A and 5B are schematic diagrams showing a track format of a tape.

FIG. 5A shows the track structure in the case that APT= 000. As shown in the drawing, on the track, areas 1, 2, and 3 are defined. In addition, the positions of the areas, the structure of the sync blocks, the structure of the ECC, which protects data against an error, gaps for protecting each area, and an overwrite margin for protecting overwrite data are defined. Each area has an application ID that defines the data structure thereof. The application IDs have the following definitions.

AP1 . . . defines the data structure of the area 1.

AP2 . . . defines the data structure of the area 2.

AP3 . . . defines the data structure of the area 3.

When the application ID of each area is 000, it has the following definition.

AP1=000 . . . uses the data structure of audio of CVCR, AAUX.

AP2=000 . . . uses the data structure of video of CVCR, VAUX.

AP3=000 . . . uses the data structure of sub-code of CVCR, ID.

where

CVCR: home use digital image/sound data recording/ reproducing apparatus

AAUX: audio auxiliary data

VAUX: video auxiliary data

Figure 5B:
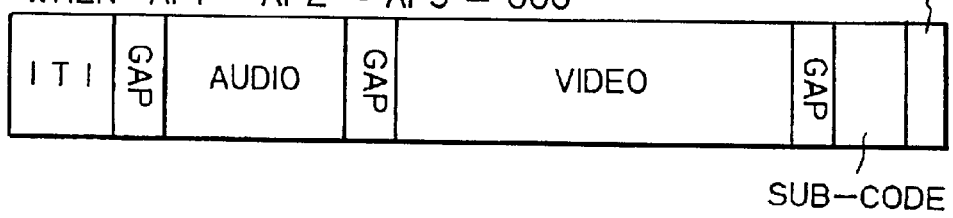

In other words, in the case of a home use digital VCR, as shown in FIG. 5B, the following definitions are given.

APT, AP1, AP2, and AP3=000 In addition, the value of the APM becomes 000.

Figures 6, 7:
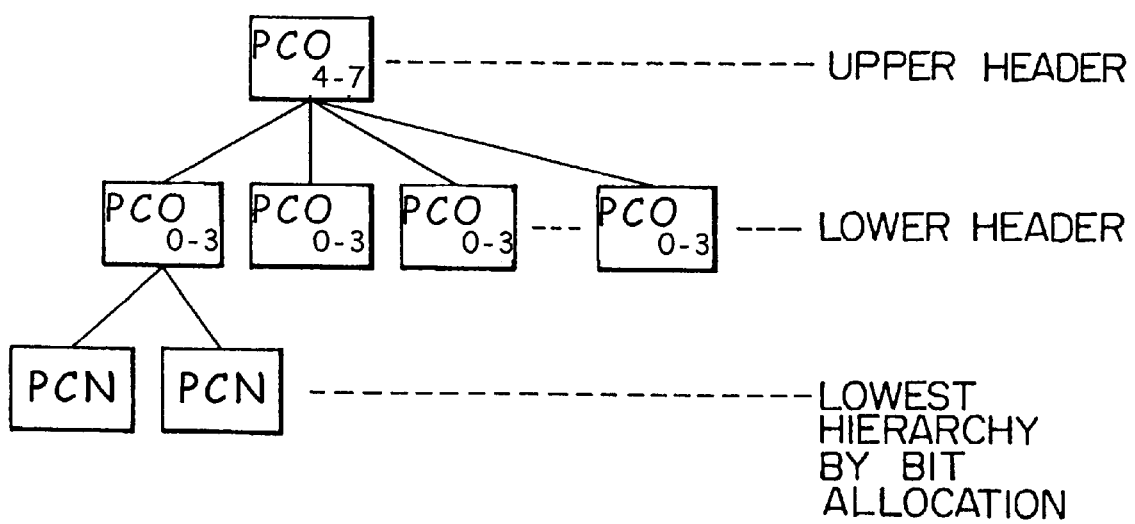
FIG. 6 is a s schematic diagram showing a structure of a pack.
FIG. 7 is a schematic diagram showing a hierarchical structure of a header.

When APT=000, each area of the AAUX, the VAUX, the sub-code, and the MIC is written in a common pack structure. As shown in FIG. 6, one pack has five bytes (PC0 to PC4). The first one byte is a header and the remaining four bytes are data. The pack is a minimum unit of a data group. One pack is composed of related data.

Eight bits of the header are divided into high order four bits and low order four bits that are hierarchically structured. As shown in FIG. 7, the high order four bits ($PC0_{4-7}$) the low order four bits ($PC0_{0-3}$) hierarchically structured as an upper header and a lower header, respectively. In addition, the number of levels can be increased by assigning bits as shown by the lowest hierarchy by bit allocation. In this hierarchical structure, the content of the pack can be clearly structured and easily expanded. The upper header and the lower header compose a pack header table that forms 256 space portions. The pack header table is provided along with the content of each pack. With the pack header table, each area is written. The byte length of the pack structure is basically fixed to five bytes. However, only when character data is written to the MIC, a variable length pack structure is used. This is because the limited buffer memory is effectively used.

FIG. 8A is a table showing the data arrangement of an AAUX source pack in the case that the byte PC0 of the header is (50h). There are many data structure types of packs corresponding to the header. The pack shown in FIG. 8A has a strong relation to the present invention. Each bit of the byte PC1 has the following definition.

LF (one bit): represents whether or not the video sampling frequency and the audio sampling frequency are locked.

AFSIZE (six bits): represents the size (the number of audio samples) of the audio frame in one video frame.

Each bit of the byte PC2 has the following definition.

CH (three bits): represents the audio channel mode (see FIG. 8B). In this case, the three bits are (011). "lumped 8 ch" represents the mode for reproducing all eight channels.

PA (one bit): represents that two channels are reproduced at the same time. When CH=011, PA should be always "0".

AUDIO MODE (four bits): represents the order of the audio data being recorded.

Each bit of the byte PC3 has the following definition.

MIX (one bit): represents whether or not composite audio data that composites each component is present. When MIX is "0", it represents that composite audio data is present. When MIX is "1", it represents that the composite audio data is not present. MIX is valid only when CH=011. When CH≠011, MIX should be 1.

ML (one bit) represents whether or not data has been recorded with multiple languages. When ML=0, it represents that data has been recorded with multiple languages. When ML=1, it represents that data has not been recorded with multiple languages.

50/60 (one bit): represents the frame frequency of the video signal.

STYPE (five bits): represents whether or not the video signal is SD or HD.

Each bit of the byte PC4 has the following definition.

EF (one bit): represents whether emphasis is present.

TC (one bit): represents a time constant.

SMP (three bits): represents a sampling frequency.

QU (three bits): represents the number of quantizing bits.

Figure 9:
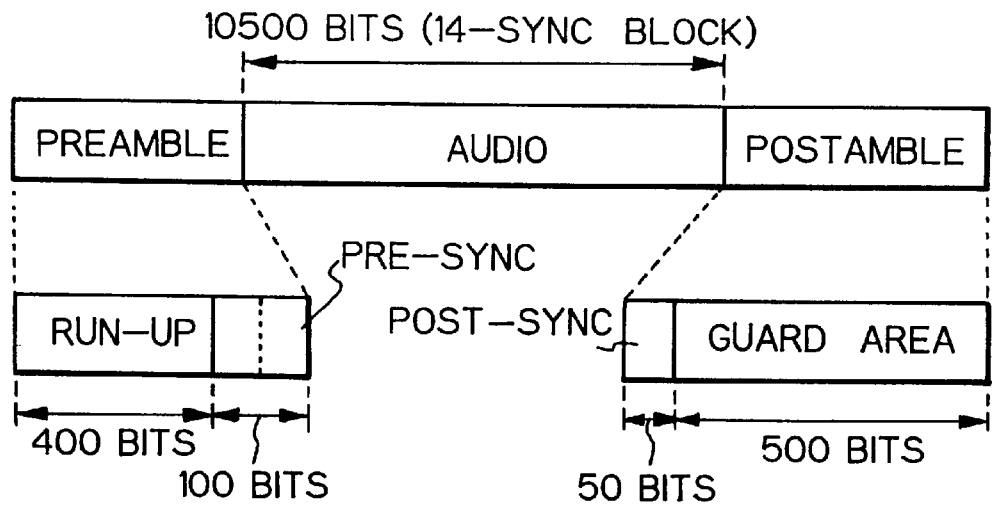
FIG. 9 is a schematic diagram showing a track format of a tape.

An audio area and a video area are referred to as an audio sector and a video sector, respectively. FIG. 9 shows the structure of an audio sector. The audio sector is composed of a preamble, a data portion, and a postamble. The preamble has 500 bits and is composed of a run-up of 400 bits and two pre-sync blocks. The run-up is used as a run-up pattern for PLL. The pre-sync is used to pre-detect an audio sync block. The data portion is composed of data of 10500 bits. The postamble has 550 bits and is composed of one post-sync block and a guard area of 500 bits. The post-sync represents the end of the audio sector with the sync number of the ID. The guard area is used to prevent an audio sector that is after-recorded from entering the next video sector.

Figure 10A:
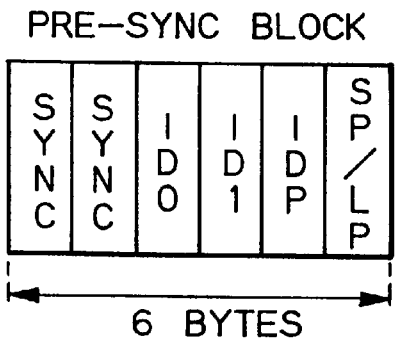
FIGS. 10A and 10B are schematic diagrams showing structures of a pre-sync and a post-sync.
Figure 10B:
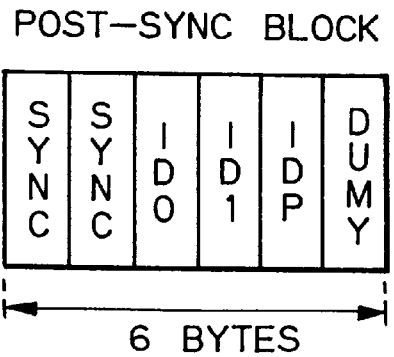

As shown in FIGS. 10A and 10B, each of the pre-sync block and the post-sync block has six bytes. The sixth byte of the pre-sync block is an SP/LP identifying byte. When the value of the SP/LP identifying byte is FFh, it represents the SP mode. When the value of the SP/LP identifying byte is 00h, it represents the LP mode. The sixth byte of the post-sync block is dummy data, FFh. The SP/LP identifying byte is also present in the TIA area as an SP/LP flag. The SP/LP identifying byte of the pre-sync block is used as a backup of the SP/LP flag in the TIA area. In other words, when the value of the TIA area can be read, it is used. Otherwise, the SP/LP identifying byte of the pre-sync block is used. Six bytes of each of the pre-sync block and post-sync block are recorded after 24–25 conversion is performed. The 24–25 conversion is a modulating system of which data of 24 bites is converted into data of 25 bits. Thus, the bit length of each of the pre-sync block and the post-sync block is as follows.

Pre-sync block 6×2×8×25÷24=100 bits

Post-sync block 6×1×8×25÷24=50 bits

Figure 11:
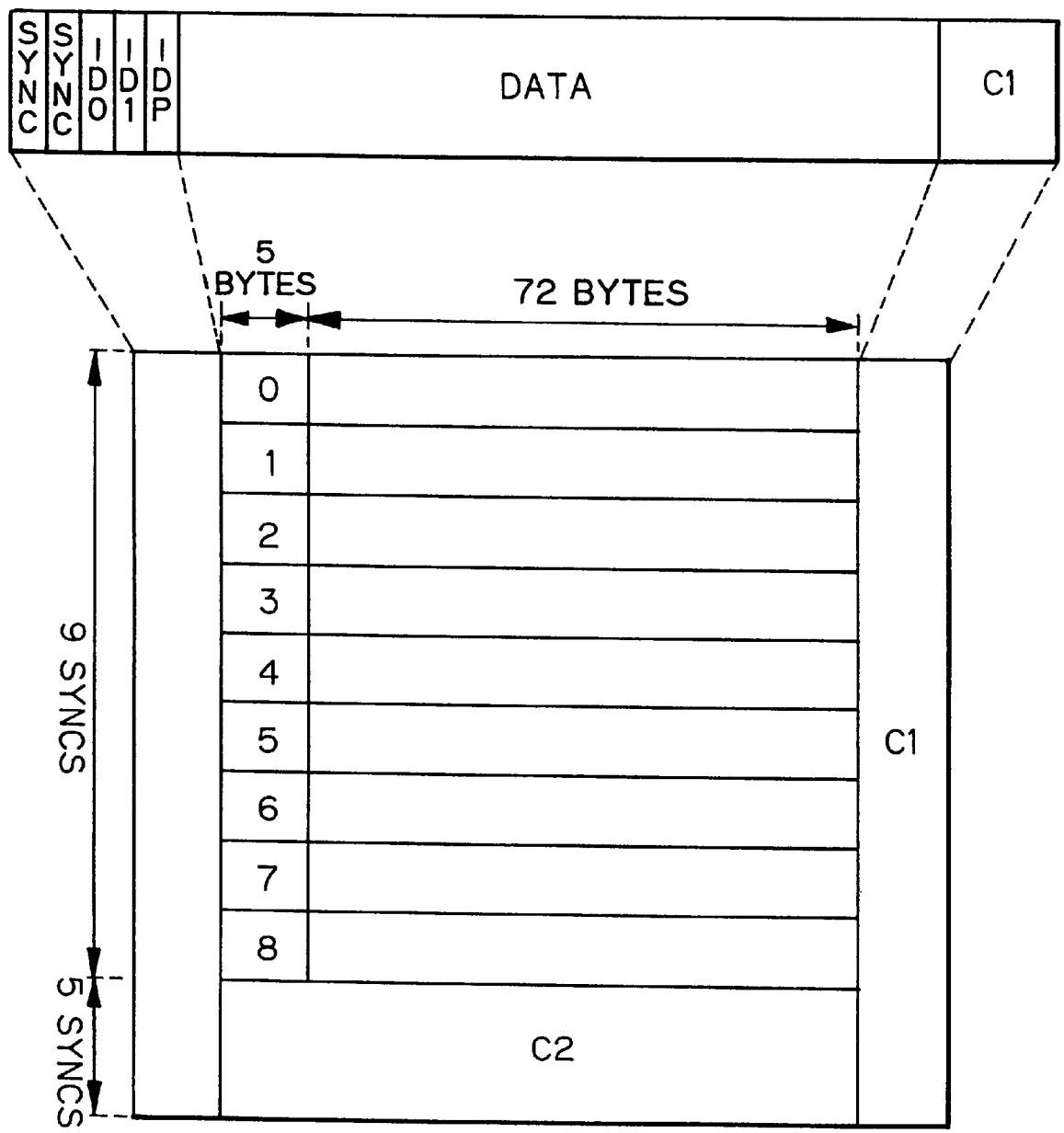
FIG. 11 is a schematic diagram showing a track format of a tape.

As shown in FIG. 11, an audio sync block has 90 bytes. The first five bytes of the audio sync block have the same structure as those of the pre-sync block and the post-sync block. A data portion has 77 bytes that are protected by a horizontal parity C1 (eight bytes) and a vertical parity C2 (five sync blocks). The number of audio sync blocks per track is 14. These audio sync blocks are recorded after the 24–25 convention is performed. Thus, the total bit length of the audio sync blocks per track is as follows.

90×14×8×25÷24=10500 bits

The first five bytes of the data portion is used for AAUX and compose one pack. Each track has nine packs. Numbers 0 to 8 in FIG. 11 represent pack numbers of the track.

Figures 12, 13:
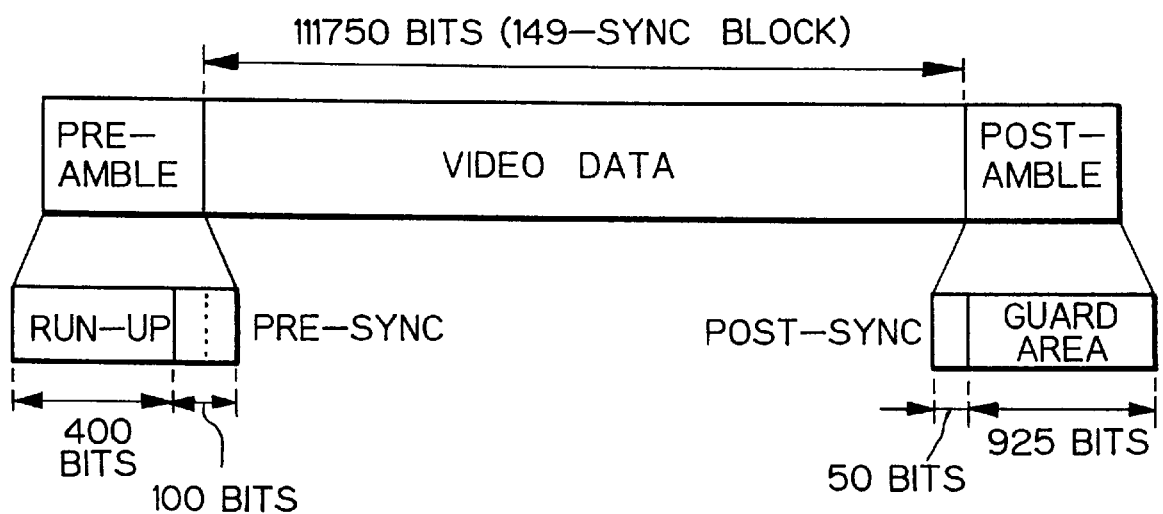
FIG. 12 is a schematic diagram showing a track format of a tape.
FIG. 13 is a schematic diagram showing a track format of a tape.

FIG. 12 is a schematic diagram showing the portion of AAUX that is arranged in the track direction. In the case of the 525 lines/60 Hz system, one video frame is composed of 10 tracks. In the case of the 625 lines/50 Hz system, one video frame is composed of 12 tracks. Audio data and sub-code are recorded and reproduced as video frames. In FIG. 12, numbers 50 to 55 represent values of pack headers (in hexadecimal notation).

As is clear from FIG. 12, the same pack is written to 10 tracks ten times. The portion to which the pack headers are written is referred to as a main area. In the main area, essential items necessary for reproducing the audio data are mainly stored. Examples of the essential items are sampling frequency and quantizing bit number. The reason why the same data is written ten times is to protect data against an error. Thus, the data in the main area can be reproduced even if horizontal scratches and channel clogging take place in transporting the tape.

The remaining packs are successively connected and used as an optional area. In FIG. 12, the remaining packs are connected in the arrow direction as in a, b, c, d, e, f, g, h, . . . that skip the packs in the main area. One video frame has 30 packs as the optional area (in the case of the 525 lines/60 Hz system) or 36 packs (in the case of the 625 lines/50 Hz system). Since this area is literally optional, packs can be freely selected from the pack header table corresponding to each digital VCR.

Figure 14:
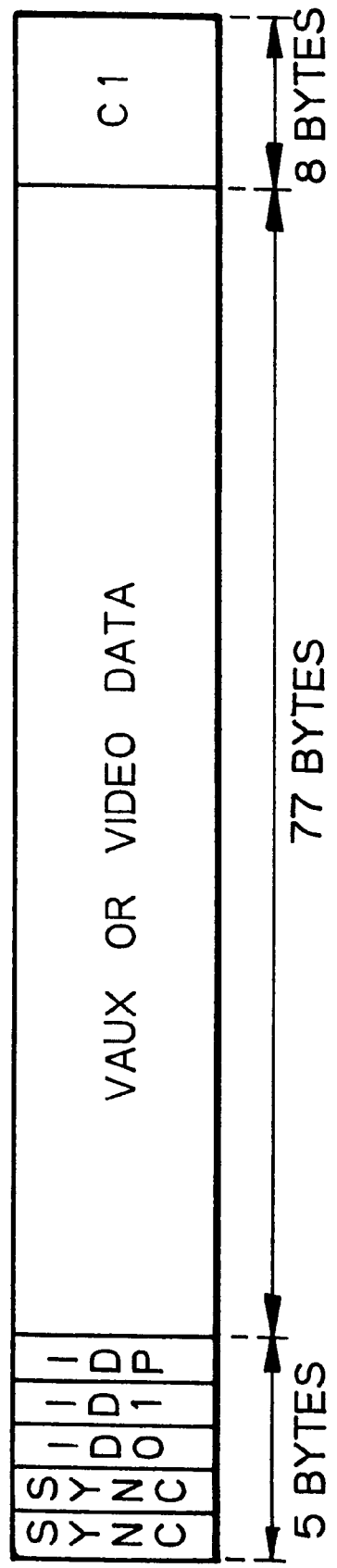
FIG. 14 is a schematic diagram showing a track format of a tape.

FIG. 13 is a schematic diagram showing the structure of a video sector. The structures of a preamble and a postamble of the video sector are the same as those of the audio video sector shown in FIG. 9. However, the number of bits of the guard area of the postamble is larger than that of the audio sector. As shown in FIG. 14, as with the audio sync block, one video sync block has 90 bytes.

Figure 15:
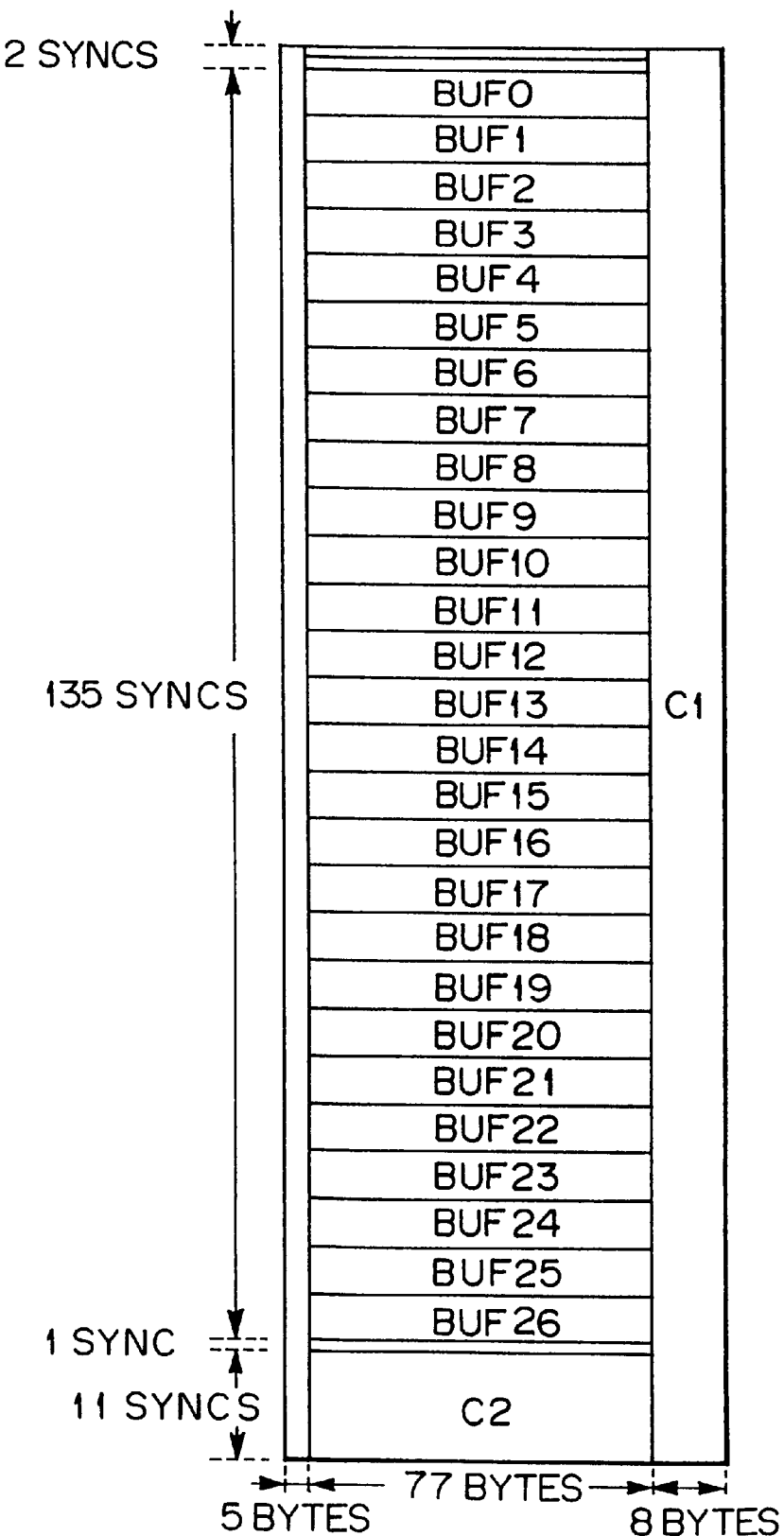
FIG. 15 is a schematic diagram showing a track format of a tape.

The first five bytes of the video sync block have the same structure as each of the pre-sync, the post-sync, and the audio sync. The data portion has 77 bytes and protected with a horizontal parity C1 (eight bytes) and a vertical parity C2 (11 sync blocks) as shown in FIG. 15. In FIG. 15, upper two sync blocks and one sync block that just precede the C2 parity are sync blocks dedicated for VAUX. Data of 77 bytes is used as VAUX data. In the sync blocks other than the VAUX dedicated syncs and the C2 syncs, video data that has been compressed corresponding to DCT (Discrete Cosine Transform) technique is stored. The video sync blocks are recorded after the 24–25 conversion is performed. Thus, the total bit length of the video sync blocks per track is as follows.

$$90 \times 149 \times 8 \times 25 \div 24 = 111750 \text{ bits}$$

FIG. 15 is a schematic diagram showing 149 sync blocks of a video sector that are arranged vertically. In FIG. 15, 135 sync blocks in the middle are used as video signal storage areas. In FIG. 15, each of BUF 0 to BUF 26 represents a buffering unit. One buffering unit is composed of five sync blocks. Each track has 27 buffering units. Thus, 10 tracks, which is one video frame, have 270 buffering units. In other words, a valid area is extracted from image data of one frame and then sampled. The resultant digital data is shuffled and 270 groups are collected from various portions of the real image. One of the 270 groups is a buffering unit.

Each group is compressed corresponding to a compressing technique such as DCT technique, quantizing technique, or variable length code encoding technique in such a manner that the data amount of the entire groups becomes a predetermined compressing value. Thus, a quantizing step of which the amount of generated data is the desired value or less is determined. Corresponding to the determined quantizing step, data is really encoded. The generated encoded data is packed in one buffering block, which has five syncs.

Figure 16:
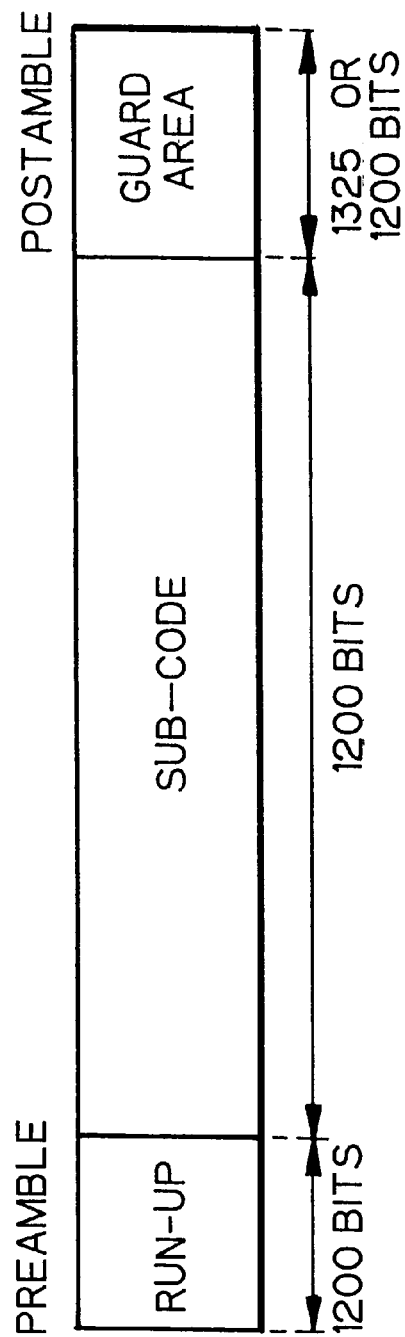
FIG. 16 is a schematic diagram showing a track format of a tape.

FIG. 16 is a schematic diagram showing the structure of a sub-code sector. Unlike with the audio sector and the video sector, a preamble and a postamble of the sub-code sector do not have a pre-sync and a post-sync. In addition, the length of the sub-code sector is longer than that of each of other sectors.

Figure 17:
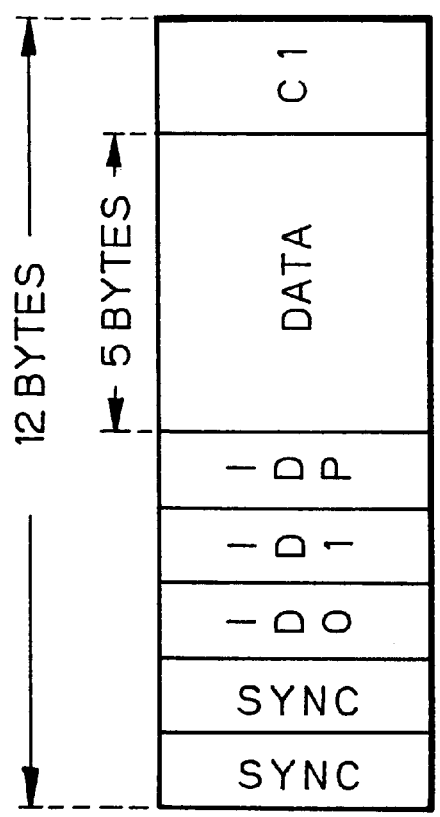
FIG. 17 is a schematic diagram showing a track format of a tape.

This is because the sub-code sector is used frequently for writing an index or the like. In addition, since the sub-code sector is formed at the last portion of the track, it is affected by an error that takes place at the beginning of the track. As shown in FIG. 17, the byte length of the sub-code sync block is at most 12 bytes. The structure of the first five bytes of the sub-code sync block is the same as that of each of the pre-sync block, the post-sync block, the audio-sync block, and the video-sync block. The next portion of five bytes is a data portion that composes packs.

The horizontal parity C1 has two bytes and protects the data portion. Unlike with the audio sector and the video sector, in the sub-code sector, a product code structure using C1 and C2 is not employed. This is because the sub-code sector is mainly used for high speed searching operation. The C2 parity is not often reproduced along with the C1 parity. In addition, for up to 200 times high speed searching operation, the sync length is as short as 12 bytes. Each track has 12 sub-code sync blocks. Since the sub-code sync blocks are recorded after the 24–25 conversion is performed, the total bit length of the sub-code sector is as follows.

$$12 \times 12 \times 8 \times 25 s \div 24 = 1200 \text{ bits.}$$

Next, with reference to FIGS. 18A, 18B, 19A, 19B and 20A and 20B, a digital VCR that records and reproduces video, audio, and sub-code with above-described data structure will be described. In this digital VCR, a composite color video signal is separated into a digital luminance signal (Y), and color difference signals (R−Y), and (B−Y). The separated signals are compressed and recorded corresponding to a highly efficient encoding system using DCT transform technique and variable length encoding technique.

In FIGS. 18A and 18B, a TV wave signal is received from an antenna 1. The signal received from the antenna 1 is supplied to a tuner portion 2. The tuner portion 2 demodulates the TV signal into a composite color video signal (corresponding to such as NTSC system or PAL system) and an audio signal. The composite video signal is supplied from the tuner portion 2 to a switch 3a. The audio signal is supplied to a switch 3b.

An analog composite video color video signal is supplied to an external video input terminal 4. The composite video signal is supplied from the external video input terminal 4 to the switch 3a. An analog audio signal is supplied to an external audio input terminal 5. The analog audio signal is supplied to the switch 3b.

The switch 3a selects one of the composite video signal received from the tuner portion 2 and the composite video signal received from the external video input terminal 4. The output of the switch 3a is supplied to a Y/C separating circuit 6 and a synchronous separating circuit 11. The Y/C separating circuit 6 separates a luminance signal (Y) and color difference signals (R−Y) and (B−Y) from the composite video signal.

The luminance signal (Y) and the color difference signals (R−Y) and (B−Y) received from the Y/C separating circuit 6 are supplied to A/D converters 8a, 8b, and 8c through low pass filters 7a, 7b, and 7c, respectively. The low pass filters 7a, 7b, and 7c limits the band of the input signal so as to remove a loop-back distortion. The low pass filters 7a, 7b, and 7c are used for the luminance signal (Y) (sampling frequency: 13.5 MHz (4× rate), the color difference signal (R−Y) (sampling frequency: 6.75 MHz (2× rate), and the color difference signal (B−Y) (sampling frequency: 3.375 MHz (1× rate), respectively. The shut-off frequencies of the low pass filters 7a, 7b, and 7c are 5.75 MHz, 2.75 MHz, and 1.45 MHz, respectively.

The synchronous separating circuit 11 outputs a vertical synchronous signal (V sync) and a horizontal synchronous signal (H sync). The vertical synchronous signal (V sync) and the horizontal synchronous (H sync) received from the synchronous separating circuit 11 are supplied to a PLL (Phase Locked Loop) circuit 12. The PLL circuit 12 generates the basic sampling frequency 13.5 MHz that is locked to the input video signal. As described above, the sampling frequency 13.5 MHz is referred to as 4× rate.

The clock of the basic sampling frequency 13.5 MHz is supplied to the A/D converter 8a. The clock of the basic sampling frequency 13.5 MHz is supplied to a frequency divider 13. The frequency divider 13 generates a clock with the ¼ frequency of the basic sampling frequency. The clock (1× rate) with the ¼ frequency of the basic sampling frequency is supplied to the A/D converters 8b and 8c.

Digital component video signals (Y), (R−Y), and (B−Y) supplied from the A/D converters 8a, 8b, and 8c are supplied to a block segmenting circuit 9. The block segmenting circuit 9 segments the data of a real image into blocks, each of which is formed of eight samples×eight lines. The output of the block segmenting circuit 9 is supplied to a shuffling circuit 10. The shuffling circuit 10 shuffles the blocks. The shuffling process is performed so as to prevent data recorded on the tape from being lost due to head clogging and horizontal scratches of the tape. In addition, the shuffling circuit 10 changes the order of the blocks so that the luminance signal and the color difference signals can be easily processed in the later circuits.

The output of the shuffling circuit 10 is supplied to a data compressing and encoding circuit 14. The data compressing and encoding circuit 14 comprises a compressing circuit (that corresponds to DCT technique), an estimator (that determines whether or not the data has been compressed in a predetermined level), and a quantizing device (that quantizes the compressed data with a quantizing step corresponding to the determined result). The compressed video data is packed in a predetermined sync block by a framing circuit 15 corresponding to a predetermined rule. The output of the framing circuit 15 is supplied to a compositing circuit 16.

The switch 3b selects the audio signal received from the tuner portion 2 or the audio signal received from the external audio signal input terminal 5. The output of the switch 3b is supplied to an A/D converter 21. The A/D converting circuit 21 converts the analog audio signal into digital audio signal. The digital audio signal is supplied to a shuffling circuit 22. The shuffling circuit 22 shuffles the digital audio data. The output of the shuffling circuit 22 is supplied to a framing circuit 23. The framing circuit 23 packs the audio data in an audio sync block. The output of the framing circuit 23 is supplied to a compositing circuit 24.

A mode process microcomputer 34 is a microcomputer that shares a man-machine interface. The mode process microcomputer 34 operates corresponding to a field frequency 60 Hz or 50 Hz of the TV image. Since a signal process microcomputer 20 operates on a side closer to machine, it operates in synchronization with the rotation of drum at 9000 rpm and 150 Hz.

The mode process microcomputer 34 generates pack data of video auxiliary data VAUX, audio auxiliary data AAUX, and sub-code. An absolute track number contained in a "title end" pack is generated by a signal process microcomputer 20. A TTC (time title code) stored in the sub-code is generated by the signal process microcomputer 20.

The video auxiliary data VAUX generated by the signal process microcomputer 20 is supplied to the compositing circuit 16 through a VAUX circuit 17. The compositing circuit 16 composites the output of a framing circuit 15 and the video auxiliary data VAUX. The audio auxiliary data AAUX generated by the signal process microcomputer 20 is supplied to a compositing circuit 24 through an AAUX circuit 19. The compositing circuit 24 composites the output of a framing circuit 23 and the audio auxiliary data AAUX. The outputs of the compositing circuits 16 and 24 are supplied to a switch 26.

A sub-code circuit 18 generates data SID of the ID portion, AP3, and sub-code pack data SDATA corresponding to the output the signal process microcomputer 20. The generated data are supplied to a switch 26. A sync generating circuit 25 generates each ID portion of AV (audio/video), pre-sync, and post-sync that are supplied to a switch 26. A circuit 25 generates AP1 and AP2 that are placed in a predetermined ID portion. The switch 26 selects one of the outputs of the circuit 25, ADATA, VDATA, SID, and SDATA at a predetermined timing.

The output of the switch circuit 26 is supplied to an error correction code generating circuit 27. The error correction code generating circuit 27 adds a predetermined parity to the output of the switch circuit 26. The output of the error correction code generating circuit 27 is supplied to a randomizing circuit 29. The randomizing circuit 29 randomizes the output of the error correction code generating circuit 27 so that record data does not deviate. The output of the randomizing circuit 29 is supplied to a 24/25 converting circuit 30 that converts 24-bit data into 25-bit data so as to remove DC component for magnetic recording/reproducing operation. In addition, PRIV (partial response, class 4) coding process ($1/1-D^2$) (not shown) suitable for digital recording is performed.

The output of the 24/25 converting circuit 30 is supplied to a compositing circuit 31. The compositing circuit 31 composites the output of the 24/25 converting circuit and a sync pattern of audio, video, and sub-code. The output of the compositing circuit 31 is supplied to a switch 32.

A mode process microcomputer 34 that manages the modes of the VCR outputs data APT, SP/LP, and PF to an ITI circuit 33. The ITI circuit 33 generates ITI sector data. The switch 32 selects one of such data and amble pattern corresponding to a predetermined timing.

The data selected by the switch 32 is supplied to a switch 35. The switch 35 selects a head amplifier 36a or a head amplifier 36b corresponding to a head switching timing. The output of the switch 35 is amplified by the head amplifiers 36a and 36b and supplied to heads 37a and 37b, respectively. A switch block 40 is an external switch block of the VCR. The switch block 40 selects various modes such as recording and reproducing modes. The switch block 40 includes an SP/LP record mode setting switch. The switch signals of the switch block 40 are supplied to a mechanical control microcomputer 28 and a signal process microcomputer 20.

In the digital VCR according to the present invention, the digital luminance signal (Y), and the color difference signals (R−Y) and (B−Y) are compressed and recorded on the video sector. The digital audio signal is recorded on the audio sector.

In addition, VAUX and AAUX are recorded. The data of VAUX and the data of AAUX are recorded in pack structure.

Next, with reference to FIGS. 19A, 19B, 20A and 20B, the construction of the reproducing section of the digital VCR according to the present invention will be described. In FIGS. 19A and 19B, signals obtained from heads 101a and 101b are supplied to head amplifiers 102a and 102b, respectively. The outputs of the amplifiers 102a and 102b are selected by a switch 103. The output of the switch 103 is supplied to an equalizer circuit 104. When data is recorded, so as to improve electromagnetic converting characteristics of the tape and the magnetic heads, a so-called emphasis process (for example, partial response, class 4) is performed. The equalizer circuit 104 performs an inverse process of the emphasis process.

The output of the equalizer circuit 104 is supplied to an A/D converter 106 and a clock extracting circuit 105. The clock extracting circuit 105 extracts a clock component. The output of the equalizer circuit 104 is digitized by an A/D converter 106 corresponding to the extracted clock. The resultant one-bit data is written to a FIFO 107.

The output of the FIFO 107 is supplied to a sync pattern detecting circuit 108. A sync pattern of each area is supplied to the sync pattern detecting circuit 108 through a switch 109. The switch position of the switch 109 is changed corresponding to a timing circuit 113. The sync pattern detecting circuit 108 has a so-called flywheel construction. In the flywheel construction, whenever a sync pattern is detected, it is determined whether or not the same sync pattern is received after an interval of a predetermined sync length. When this determined result is yes for example three times or more, it is determined that the sync pattern is true so as to prevent an error from taking place.

When a sync pattern is detected, the shift amount for forming one sync block extracted from each stage of the FIFO 107 is determined. Corresponding to the shift amount, required bits are supplied to a sync block settlement latch 111 through a switch 110. Thus, the sync number of the obtained sync is extracted by an extracting circuit 112. The extracted sync number is supplied to a timing circuit 113. Since the head position on the track can be determined corresponding to the sync number, the switch positions of the switches 109 and 114 are changed.

In the case of the ITI sector, the switch 114 is placed at the lower position. A separating circuit 115 separates an ITI sync pattern. The ITI sync pattern is supplied to an ITI decoder 116. In the ITI area, encoded data is recorded. Thus, by decoding the data in the ITI area, data of APT, SP/LP, and PF can be obtained. The decoded data is supplied to a mode process microcomputer 117 that determines the operation mode and the like of the VCR. A mode process microcomputer 117 is connected to an external operation key 118. The mode process microcomputer 117 controls the entire system of the apparatus in association with a mechanical control microcomputer 128 and a signal process microcomputer 151.

In the case of the A/V sector or sub-code sector, the switch 114 is placed in the upper position. A separating circuit 122 extracts a sync pattern of each sector and supplies the extracted sync pattern to a derandomizing circuit 124 through a 24/25 inverse converting circuit 123 so as to restore an original data sequence. The restored data is supplied to an error correcting circuit 125.

The error correcting circuit 125 detects and corrects error data. When data that cannot be corrected is present, an error flag is added thereto. Each data is switched by a switch 126.

A circuit 127 processes the ID portion of the A/V sector, the pre-sync, and the post-sync. The circuit 127 extracts the sync number, track number, and SP/LP stored in each sync of pre-sync and post-sync. These data are supplied to the timing circuit 113 that generates various timing signals.

In addition, the circuit 127 extracts AP1 and AP2 and supplies them to the mode process microcomputer. The mode process microcomputer determines the format corresponding to AP1 and AP2. When AP1 and AP2=000, the mode process microcomputer defines an area 2 as an image data area and thereby that the normal operation is performed. Otherwise, the mode process microcomputer performs a warning process.

The mode process microcomputer 117 determines SP/LP information stored in the ITI area. In an TIA area of the ITI area, the SP/LP information is written three times. By the rule of majority, the reliability of the SP/LP information is improved. In the audio sector and video sector, there are a total of four syncs in which the SP/LP information is written. In addition, by the rule of majority, the reliability is further improved. Finally, if the SP/LP information written to the ITI area does not accord with that written to the pre-syncs, the SP/LP information written to the ITI area is used with higher precedence.

Figure 20B:
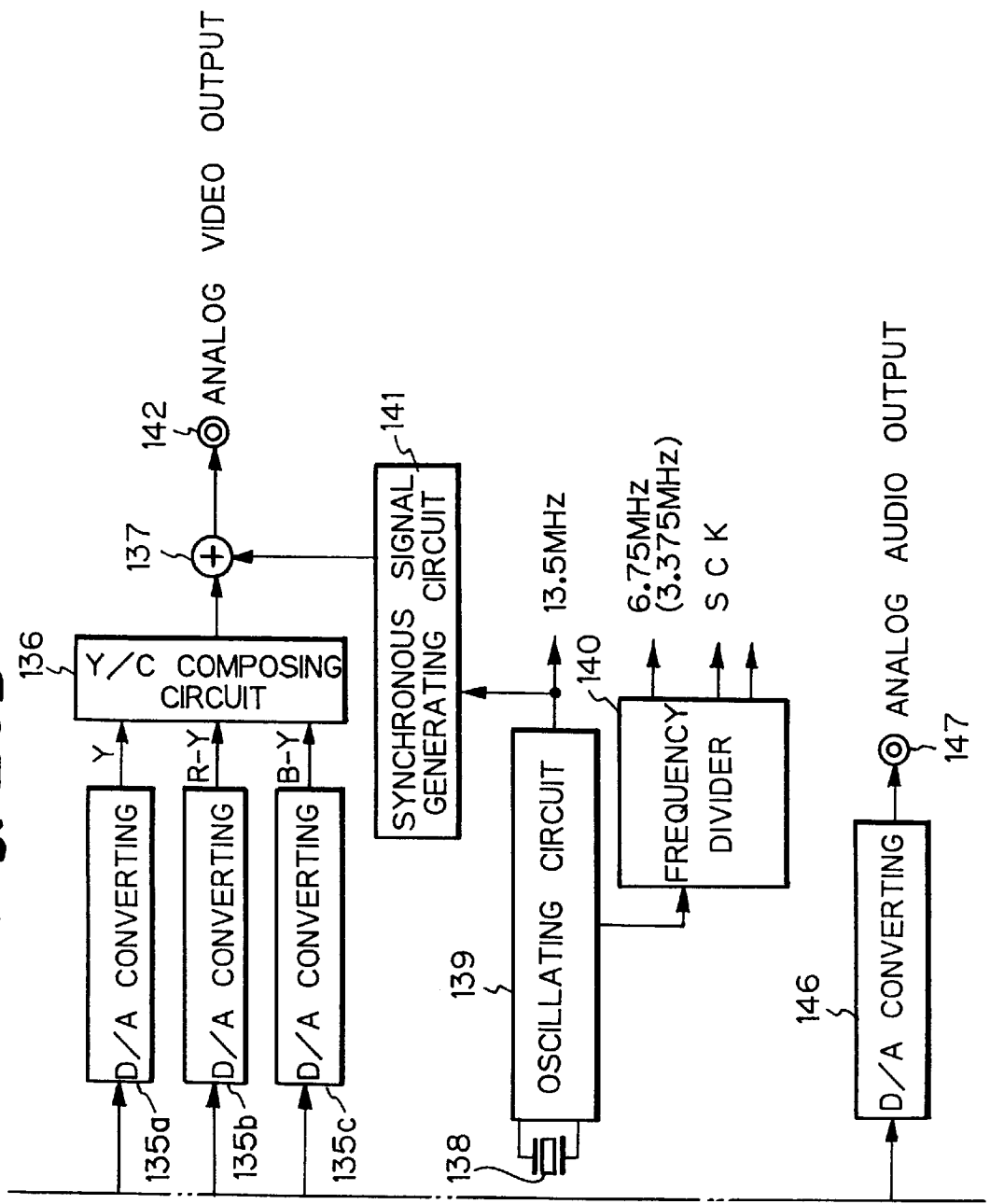

The reproduced data of a video sector is separated into video data and VAUX data by a switch 129 shown in FIGS. 20A and 20B. The video data is supplied to a deframing circuit 130 along with the error flag. The deframing circuit 130 deframes the video data.

Image data is supplied to a data decompressing and decoding portion (decoding portion of compressed code). The data decompressing and decoding portion is constructed of a dequantizing circuit 131 and a decompressing circuit 132 that decompress the video data. The decompressed data is supplied to a deshuffling circuit 133 and a block desegmenting circuit 134 that restore the original image sequence.

The output of the deshuffling circuit 133 is processed by three systems of the luminance signal (Y) and color difference signals (R−Y) and (B−Y). D/A converters 135$a$, 135$b$, and 135$c$ restore the luminance signal (Y) and color difference signals (R−Y) and (B−Y) to their analog signals corresponding to the output (13.5 MHz) of an oscillating circuit 139 and divided frequencies (6.75 MHz and 3.375 MHz) of the frequency divider 140.

These signals are composited by an Y/C compositing circuit 136. A compositing circuit 137 composites the output of the Y/C compositing circuit 136 and the synchronous signal output of a synchronous signal generating circuit 141. The output of the compositing circuit 137 is supplied to an output terminal 142. The output terminal 142 outputs a composite analog video signal.

Data reproduced from the audio sector is supplied to a switch 143 that separates the data into audio data and AAUX data. The audio data is supplied to a deshuffling circuit 145. The deshuffling circuit 145 restores the original time base of the audio data. At this point, when necessary, the audio data is interpolated corresponding to the error flag. The output of the deshuffling circuit 145 is supplied to a D/A converter 146. The D/A converter restores an analog audio signal. The analog audio signal is output to an output terminal 147 in synchronization with the video data.

Data of VAUX and AAUX selected by the switches 129 and 143 are supplied to a VAUX circuit 148 and an AAUX circuit 150, respectively. The VAUX circuit 148 and the AAUX circuit 150 perform pre-processes such as rule-of-majority process for multiple write situation corresponding to the error flag. The ID portion and the data portion of the sub-code sector are supplied to a sub-code circuit 149. The sub-code circuit 149 performs a pre-process such as the rule-of-majority process corresponding to the error flag. The output of the sub-code circuit 149 is supplied to a signal process microcomputer 151 that performs the final reading operation.

Next, the record format of the digital audio signal of the digital VCR will be described. There are two audio modes that are (1) sample frequencies: 48 kHz, 44.1 kHz, and 32 kHz, 16-bit linear quantization and (2) sampling frequency: 32 kHz, 12-bit nonlinear quantization. The relation of data amount between the two modes is (2:1). For business use, a 20-bit mode is also provided.

As shown in FIG. 11, there is an area for storing audio data of a nine-sync block per track. In this area, data of (72×9=648 bytes) is stored. For five tracks, data of (648×5=3240 bytes) is stored. This data amount is equivalent to the data amount of digitized audio signal for one video frame. In other words, this data amount is equivalent to the data amount of digital audio data on one channel every five tracks (60 Hz system) or six tracks (50 Hz system) in 16-bit mode. Next, the audio data in the case of the five-track system will be described.

FIG. 21A is a schematic diagram showing an audio track of an HD recording VCR. In FIG. 21A, each block represents the storage capacity of audio data for five tracks. In the HD recording format, since one video frame is composed of 20 tracks, four blocks are formed. In a 16-bit mode, since the data of each block is equivalent to the data amount of one channel. Thus, in the four blocks, audio data of four channels (CH1, C2, CH3, and CH4) can be placed. In a 12-bit mode (FIG. 21), since audio data for two channels is placed for every five tracks, there are storage areas for a total of eight channels (CH1 to CH8).

[0082]

Figure 22A:
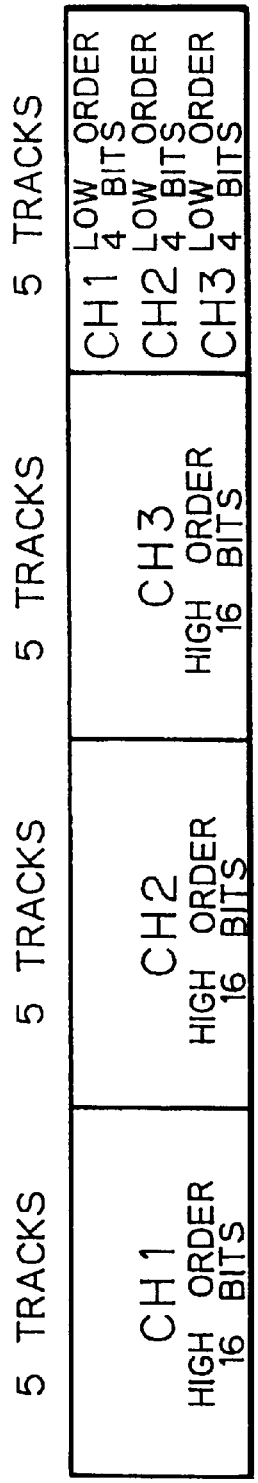
FIGS. 22A,B are schematic diagrams showing a business-use type record format.
Figure 22B:
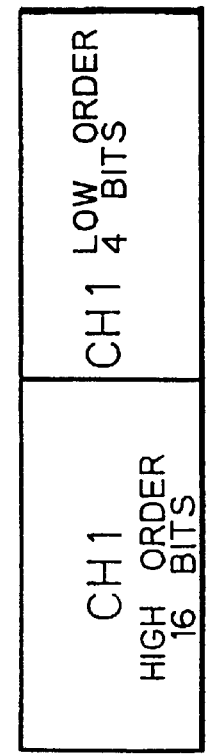

As shown in FIG. 21C, in the SD recording VCR, since one video frame has 10 tracks, the number of channels of the audio data that can be recorded is half that in the HD recording VCR. An SD audio format in which two channels of audio data can be recorded is referred to as SD 2ch. An SD audio format in which four channels of audio data can be recorded is referred to as SD 4ch (FIG. 21D). An HD audio format in which four channels of audio data can be recorded is referred to as HD 4ch. An HD audio format in which eight channels of audio data can be recorded is referred to as HD 8ch. FIG. 22A shows a business use 20-bit mode. In the business use 20-bit mode for the HD recording mode, digital audio signal for three channels can be recorded. In the business use 20-bit mode for the SD recording mode, digital audio signal for one channel can be recorded (FIG. 22B).

As shown in FIG. 21A, when the digital audio signal is recorded on the tape, each channel of digital audio signal can be successively recorded on every five tracks of successive 20 tracks. However, a plurality of channels of data can be recorded on five tracks or one track (compare FIG. 21B). As described above, audio data is shuffled on each channel. These processes are performed so as to reduce the influence of error caused by scratches on the tape, clogging of the head, and the like. The important point of the present invention is in that record format has an area in which each channel of digital audio signal is recorded for a predetermined, i.e., variable data amount.

Figure 23A:
FIGS. 23A–C are schematic diagram showing a record example of SD 2ch format.
Figure 23B:
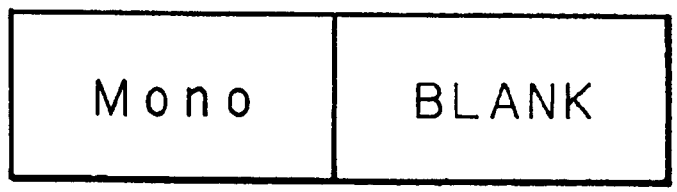
Figure 23C:
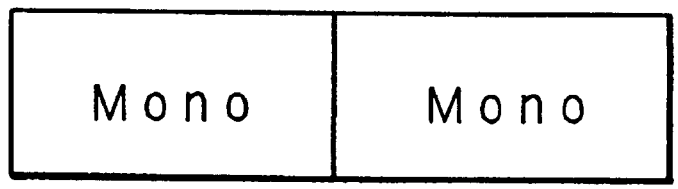

FIGS. 23A–C show a record example in the SD 2ch format. FIGS. 24A–C show record examples in the SD 4ch and HD 4ch formats. Each block in the SD 2ch format represents a data storage area for five tracks. Each pair of blocks in the HD 4ch format represents a data storage area for five tracks. Each block in the HD 4ch format represents a data storage area for five tracks. In the SD 2ch format shown in FIG. 23A, L (left channel) and R (right channel) for every five tracks can be recorded. In the case of the monaural mode (FIGS. 23B,C), blank areas for five tracks are formed.

In the record examples in the SD 4 ch format and the HD 4 ch format shown in FIGS. 24A–C represents an audio channel for a center speaker. For example, in the case of a movie video soft tape, the speech is recorded in the channel C. S represents a side channel of a speaker disposed on the side of an ear of a listener. R represents a rear channel of a speaker disposed on the rear of a ear of a listener. Ls and Rs represent channels for speakers disposed in rear oblique directions. In FIG. 24C, "2 way stereo" is used for reproducing a bilingual program.

As is clear from FIGS. 23A–C and 24A–C , there are many combinations of data storage areas. FIGS. 25A–D show layouts of stereo systems using three or more speakers (3/0 stereo, 3/1 stereo, 2/2 stereo, and 3/1 stereo). In the case of one surround system, the same signal is supplied to two speakers that are disposed beside the ears of the listener (CCIR recommendation) or in the rear oblique directions (MUSE recommendation).

Figure 26:
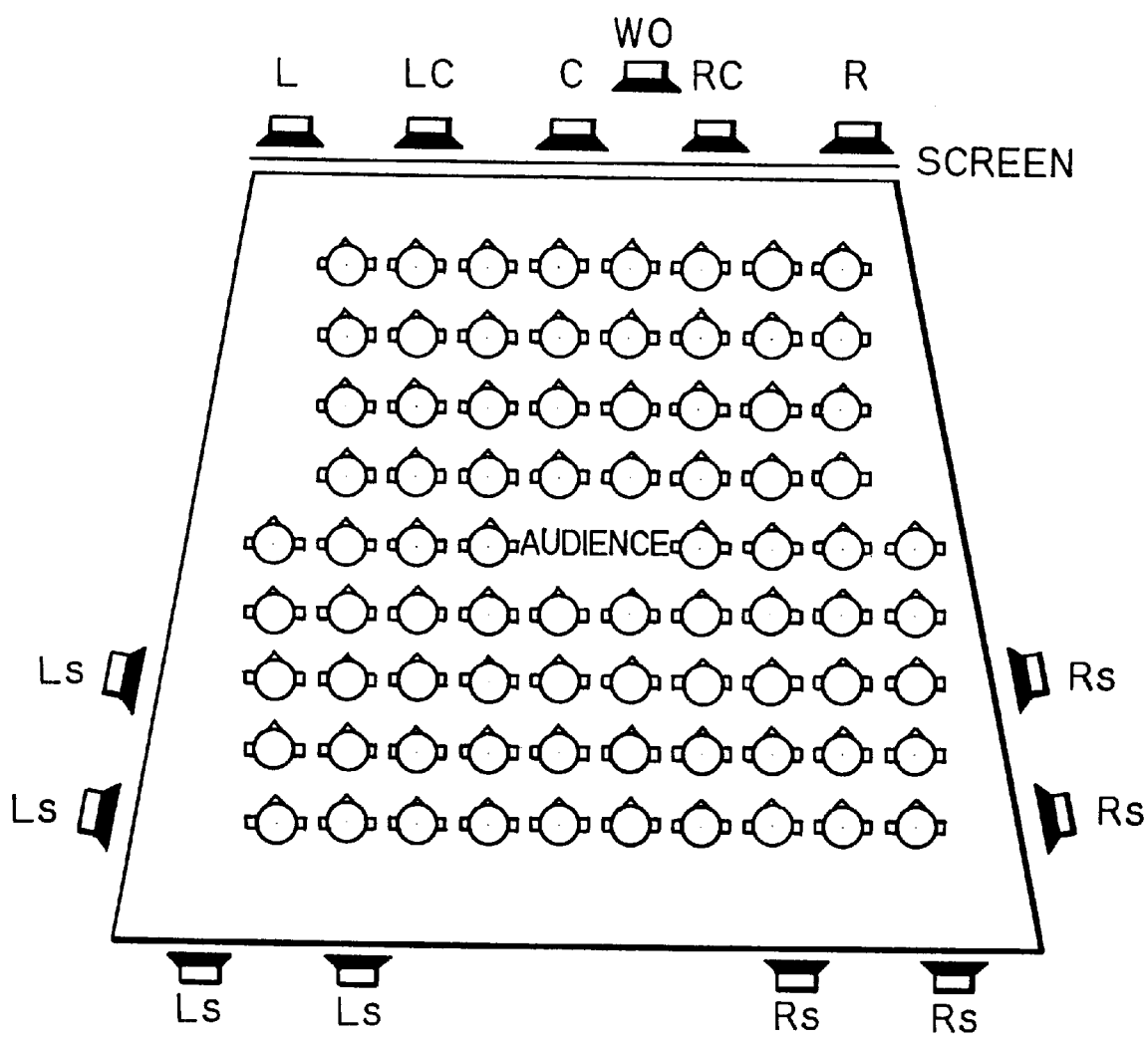
FIG. 26 is a schematic diagram showing a layout of speakers in a theater type multiple-channel speaker stereo system.

Conventionally, analog mix surround systems have been mainly used (as in Dolby system). However, as image quality has been improved (for example, SFX), there have been many problems (such as bad separation, difficulty of multiple channels, and improper dynamic range). To solve such problems, as shown in FIG. 26, movie theater type multiple channel digital surround systems have been proposed and part of them have been really used. In FIG. 26, WO represents a channel for a speaker that reproduces ultra low pitched sound (namely, super woofer). A system that excludes LC and RC from the system shown in FIG. 26 is a six-channel stereo.

Figure 27C:
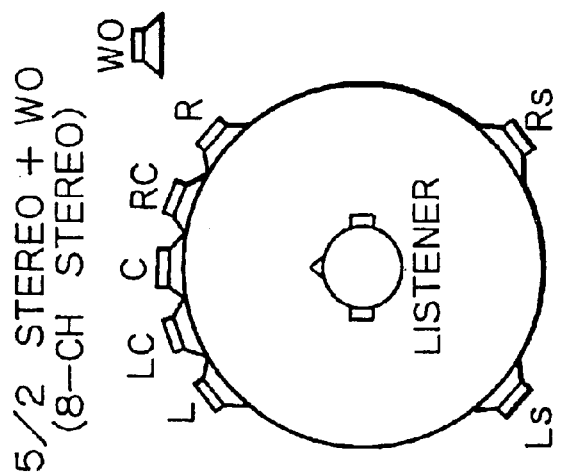
FIGS. 27A–C are schematic diagrams showing layouts of speakers in a small system modified from a theater type multiple-channel speaker stereo system.
Figure 27B:
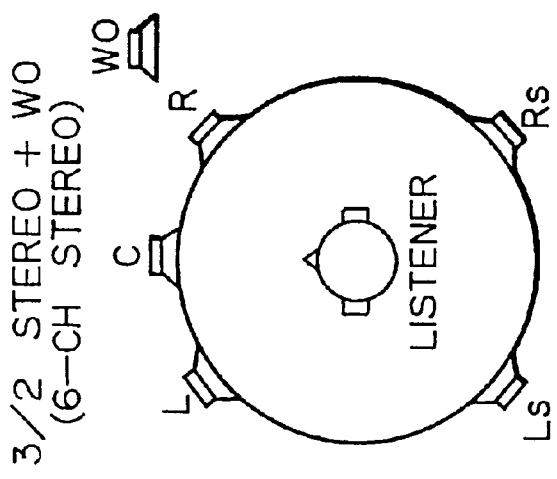
Figure 27A:
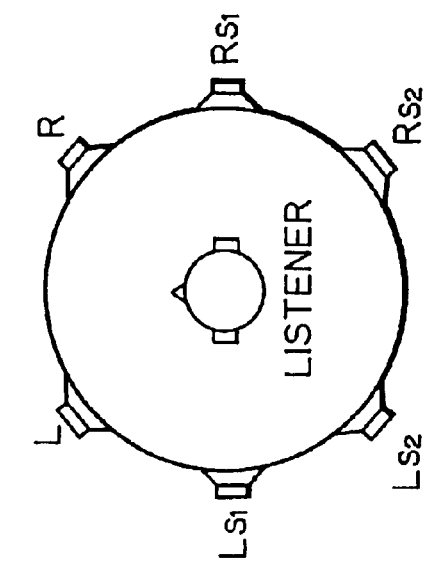

FIGS. 27A–C is a schematic diagram showing a home-use multiple-channel stereo system modified from a theater type multiple-channel speaker stereo system shown in FIG. 26. As a home-type or theater-type video soft tape reproducing system using a video projector, the layouts shown in FIGS. 27A–C can be used. The super woofer speaker can be disposed at any position (FIGS. 27B,C). This is because the listeners cannot detect the direction of ultra low-pitched sound.

In the 2/4 stereo system shown in FIG. 27A, L-channel and R-channel speakers are disposed with an angle of 60° to the listener. $Ls_1$ and $Rs_1$ speakers are disposed just beside the listener. $Ls_2$ and $Rs_2$ speakers are disposed with an angle of 45° from the rear of the listener. In the 3/2 (6-ch) stereo (FIG. 27B), L and R speakers are disposed with an angle of 60° to the listener. Ls and Rs speakers are disposed with an angle of 45° to the rear of the listener. In the case of the 5/2 (8-ch) stereo (FIG. 27C), LC and RC speakers are added to the 3/2 stereo.

As a format for recording the above-described 6-ch or 8-ch audio signals, the HD 8ch format can be used. In other words, as shown in FIGS. 28A–C, in this record format, since there are areas for independently storing data for eight channels, 6-ch stereo signals (FIG. 28B) or 8-ch stereo signals (FIG. 28C) can be recorded. In the case of the 6-ch stereo system, blank areas for two channels take place.

According to the present invention, a channel for a composite audio signal to which signals of a plurality of channels that relate each other are seated by a predetermined mixing ratio is placed in the blank area. In other words, the SD 4ch, HD 4ch, and HD 8ch of the above-described record formats are used. The first example (shown in FIG. 29A) is a stereo system for recording M (monaural) and $M_{MIX}$ (mix monaural). The second example (FIG. 29B) is a stereo system for recording L, R, and $M_{MIX}$. The third example (FIG. 29C) is a stereo system for recording L, R, M, and $M_{MIX}$. The fourth example (FIG. 29D) is a stereo system for recording L, R, C, and $M_{MIX}$. The composite audio signal is placed in the blank channel when data is recorded.

Figure 30A:
FIG. 30 is a schematic diagram showing some examples of HD 8ch record format according to the present invention.
Figure 30B:
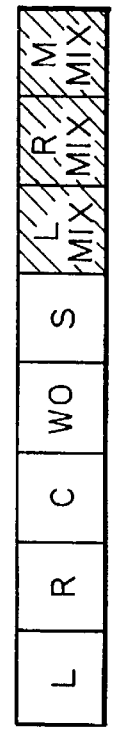
Figure 30C:
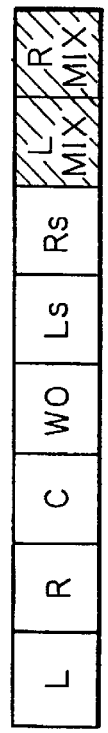
Figure 30D:
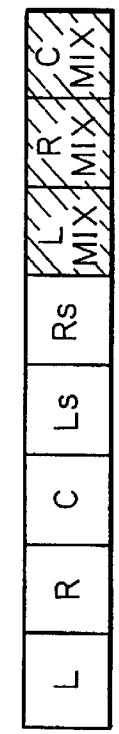
Figure 30E:
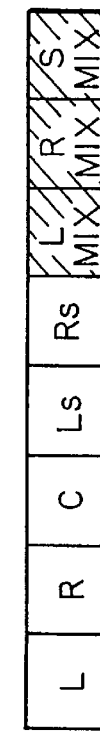
Figure 30F:
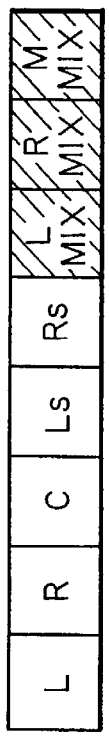

FIGS. 30A–F show several examples for recording 5- or 6-channel digital audio signal and a mix audio signal of which the digital audio signal is mixed in the HD 8ch record format. The first example of FIG. 30A is a 2/4 stereo system. The second example of FIG. 30B is a 3/1 stereo+WO (5-channel stereo) system. The third example of FIG. 30C is a 3/2 stereo (5-channel stereo) system. The fourth to sixth examples (FIGS. 30D–F, respectively) are 3/2 stereo (5-channel stereo) systems. In this systems, composite audio data is recorded on the blank channel. The mode of the composite audio signal of the first example is 2/0 stereo. The mode of the second example is 2/0 stereo+monaural. The mode of the third example is 2/0 stereo. The mode of the fourth example is 3/0 stereo. The mode of the fifth example is 2/1 stereo. The mode of the sixth example is 2/0 stereo+monaural.

An example of the compositing ratio of sound signals for reducing the number of channels, the study results have been proposed in CCIR REC 775. According to the paper, when channels (L, R, C, Ls, and Rs) of 3/2 stereo are converted into a smaller number of channels, the coefficients multiplied for each channel are as follows.

The monaural mix signal $M_{MIX}$ is calculated by:

$$M_{MIX}=0.7071 \times L+0.7071 \times R+1.0000 \times C+0.5000 \times Ls+0.5000 \times Rs \quad (1)$$

The stereo mix (2/0 stereo) signal is calculated by:

$$L_{MIX}=1.0000\times L+0.0000\times R+0.7071\times C+0.7071\times Ls+0.0000\times Rs \quad (2)$$

$$R_{MIX}=0.0000\times L+1.0000\times R+0.7071\times C+0.0000\times Ls+0.7071\times Rs \quad (3)$$

The stereo mix (3/0 stereo) signal is calculated by the following equations.

$$L_{MIX}=1.0000\times L+0.0000\times R+0.0000\times C+0.7071\times Ls+0.0000\times Rs \quad (4)$$

$$R_{MIX}=0.0000\times L+1.0000\times R+0.0000\times C+0.0000\times Ls+0.7071\times Rs \quad (5)$$

$$C_{MIX}=0.0000\times L+0.0000\times R+1.0000\times C+0.0000\times Ls+0.0000\times Rs \quad (6)$$

The stereo mix (2/1 stereo) signal is calculated by the following equations.

$$L_{MIX}=1.0000\times L+0.0000\times R+0.7071\times C+0.0000\times Ls+0.0000\times Rs \quad (7)$$

$$R_{MIX}=0.0000\times L+1.0000\times R+0.7071\times C+0.0000\times Ls+0.0000\times Rs \quad (8)$$

$$S_{MIX}=0.0000\times L+0.0000\times R+0.0000\times C+0.7071\times Ls+0.7071\times Rs \quad (9)$$

When data is reproduced from such a tape, the record pack can be easily determined corresponding to audio identification bits (AUDIO MODE, CH, MIX, etc.) in the AAUX source pack of (50h) shown in FIG. 8A. The mode process microcomputer 117 in the VCR selectively outputs a multiple-channel stereo audio signal and a composite audio signal corresponding to the user setting or the connection state of the output pin jacks.

Thus, a user who has a small-theater type multiple-channel stereo reproducing system can enjoy sound effects. On the other hand, a user who has only a two-channel stereo reproducing system allows the VCR to output a mix audio signal so as to reproduce audio data without problems. In addition, since the VCR does not need a calculating circuit or the like that converts the number of channels, the quality of signals is not deteriorated.

When a component of a channel is lost after data is reproduced, by performing an inverse matrix operation of the above described equations (1) to (9), the audio data of the lost channel can be restored. When R signal is lost from a tape on which five-channel stereo signals and stereo mix signals $L_{MIX}$, $R_{MIX}$, and $C_{MIX}$ have been recorded as shown in FIG. 30, by substituting the signals L, C, Ls, and Rs and the stereo mix signals $L_{MIX}$, $R_{MIX}$, and $C_{MIX}$ into the equations (4), (5), and (6) and solving the simultaneous equations, the lost R signal can be obtained.

Figures 31, 32A, 32B:
FIG. 31 is a schematic diagram showing an example of HD 8ch record format for recording six-channel stereo signals according to the present invention.
FIGS. 32A and 32B are schematic diagrams showing an example of coefficients of encoding calculation and decoding calculation for recording six-channel stereo signals in HD 8ch record format according to the present invention.

FIG. 31 shows another example of recording 6-channel stereo digital audio signals using the HD 8ch recording format. The difference between this example and that shown in FIG. 28 is in that components of L, R, C, Ls, and Rs are recorded as signals T, Q, and Q by calculating the coefficients shown in FIG. 32A. Thus, in comparison with the case that audio data for six channels is independently stored, the storage areas for the audio data for two channels decrease. In addition, the stereo mix signals $L_{MIX}$ and $R_{MIX}$ are generated by calculations with the coefficients shown in FIG. 32A. When data is reproduced, by performing the calculations with the coefficients shown in FIG. 32B, the audio data for each channel can be obtained.

In other words, when digital audio signals are recorded, each component can be obtained by the following equations.

$$L_{MIX}=L+0.7071(C+Ls) \quad (10)$$

$$R_{MIX}=R+0.7071(C+Rs) \quad (11)$$

$$T=0.7071C \quad (12)$$

$$Q1=0.7071(Ls+Rs) \quad (13)$$

$$Q2=0.7071(Ls-Rs) \quad (14)$$

When 6-channel stereo signals are reproduced, each component can be obtained by the following equations.

$$L=L_{MIX}-T-0.5(Q1+Q2) \quad (15)$$

$$R=R_{MIX}-T+0.5(Q1-Q2) \quad (16)$$

$$C=1.412T \quad (17)$$

$$Ls=0.7071(Q1+Q2) \quad (18)$$

$$Rs=0.7071(Q1-Q2) \quad (19)$$

As described above, the areas for two channels remain. These areas are used for the storage areas of the stereo mix signals $L_{MIX}$ and $R_{MIX}$. Thus, the storage area of each of the stereo mix signals $L_{MIX}$ and $R_{MIX}$ is doubled. The widened areas can be used for improving the sound quality of the stereo mix signals $L_{MIX}$ and $R_{MIX}$. In other words, the stereo mix signals $L_{MIX}$ and $R_{MIX}$ can be composed of digital audio signals of which the number of quantizing bits is 16 and the sampling frequency is 44.1 kHz. Thus, when two-channel stereo signals are reproduced from the mix signals, the sound quality thereof can be improved.

As a method for obtaining a signal with a different sampling frequency and a different number of bits, the audio signal for each channel of the 6-channel stereo system is converted into a digital signal of which the sampling frequency is 44.1 kHz and the number of bits is 16. Thereafter, the resultant digital signal is calculated. The components T, Q1, and Q2 are converted into a digital signal of which the sampling frequency is 32 kHz and the number of bits is 12. The converted components and non-converted stereo mix signals $L_{MIX}$ and $R_{MIX}$ are recorded. The sampling frequency is converted by an interpolating process. When 16-bit data is converted into 12-bit data, the low order four bits of the 16 bits are removed. When 6-channel stereo signals are reproduced, the sampling frequency and the number of bits of the components T, Q1, and Q2 are converted into signals (with 44.1 kHz and 16 bits). Thereafter, the calculating process is performed. Alternatively, the 6-channel audio signals are converted into signals (with 32 kHz and 12 bits). Thereafter, the calculating process is performed. The stereo mix signals may be converted into signals (with 44.1 kHz and 16 bits). Thereafter, the signals may be recorded. Moreover, in the mode of analog signals, the analog calculating process can be performed.

The present invention can be applied to the business-use 20-bit mode. In other words, in this mode, channel 3 can be used for monaural mix or the like.

The ultra low-pitched sound of WO may be composited to a monaural mix or a stereo mix with a proper composite ratio. In the conventional stereo system, since the frequencies of the ultra low-pitched sound cannot be reproduced by conventional stereo systems, the sound can be cut.

Figure 33:
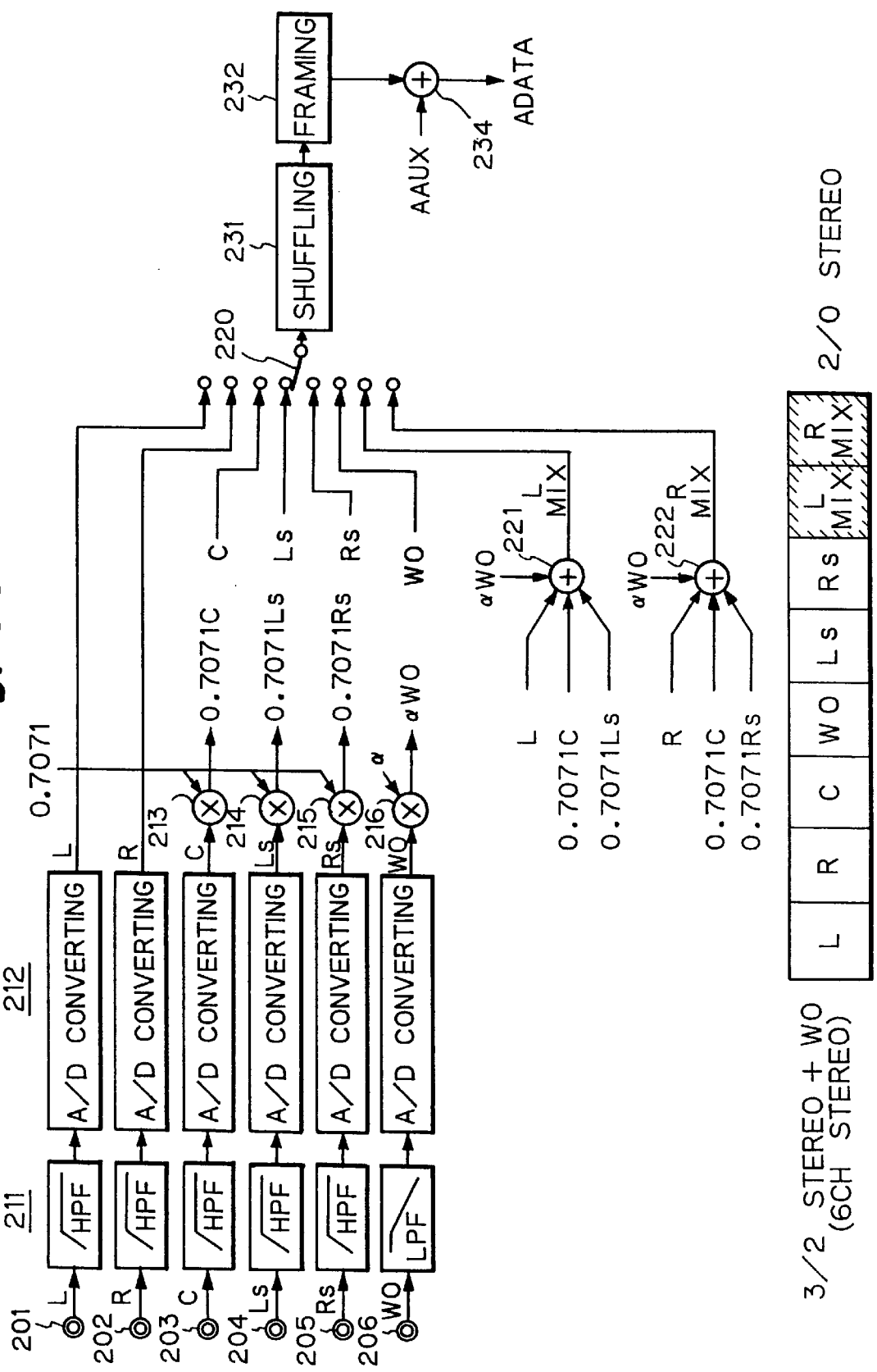
FIG. 33 is a block diagram showing an example of the construction of a recording system of an embodiment of the present invention.

Next, with reference to FIGS. 33 and 34, the construction for processing the above-described audio signals will be described. FIG. 33 shows the construction of the recording system. The lower schematic diagram of FIG. 33 shows a record format in which $L_{MIX}$ and $R_{MIX}$ are placed in blank channels. In this case, the sampling frequency and the number of bits are common in each of the 6-channel stereo signals and mix audio signals.

Six-channel analog audio signals are supplied to input terminals 201 to 206. These signals are supplied to an A/D converting portion 212 through a filter portion 211 (HPF represents a high pass filter and LPF represents a low pass filter). The A/D converter 212 accords with the A/D converter 21 shown in FIG. 18. Digital audio signals of the C, Ls, Rs, and WO channels supplied from the A/D converting portion 212 are supplied to multiplying devices 213, 214, 215, and 216, respectively.

A coefficient 0.7071 is supplied to the multiplying devices 213, 214, and 215. A particular coefficient a is supplied to the multiplying device 216. Predetermined output signals of the multiplying devices 213, 214, 215, and 216 are supplied to the adding devices 221 and 222. The adding device 221 outputs the composite audio signal $L_{MIX}$. The adding device 222 outputs the composite audio signal $R_{MIX}$. The multiplying devices 213, 214, and 215, and the adding devices 221 and 222 output composite signals corresponding to the equations (2) and (3). The real multiplications and additions can be easily accomplished by an audio DSP (Digital Signal Processor).

The original six-channel digital audio signals and the composite audio signals are supplied to a shuffling circuit 231 through a switch circuit 220 on time division basis. Thus, the composite audio signals are placed in the blank areas. A framing circuit 232 and a mixing circuit 234 are connected to the shuffling circuit 231. The shuffling circuit 231 contains a memory for eight channels. These circuits accord with the circuits 22, 23, and 24 shown in FIG. 18. The receiving system shown in FIG. 33 can be provided in the VCR. However, according to the spirit of the present invention, the recording section shown in FIG. 33 can be treated as a master tape recording portion that produces video soft tapes.

Figure 34:
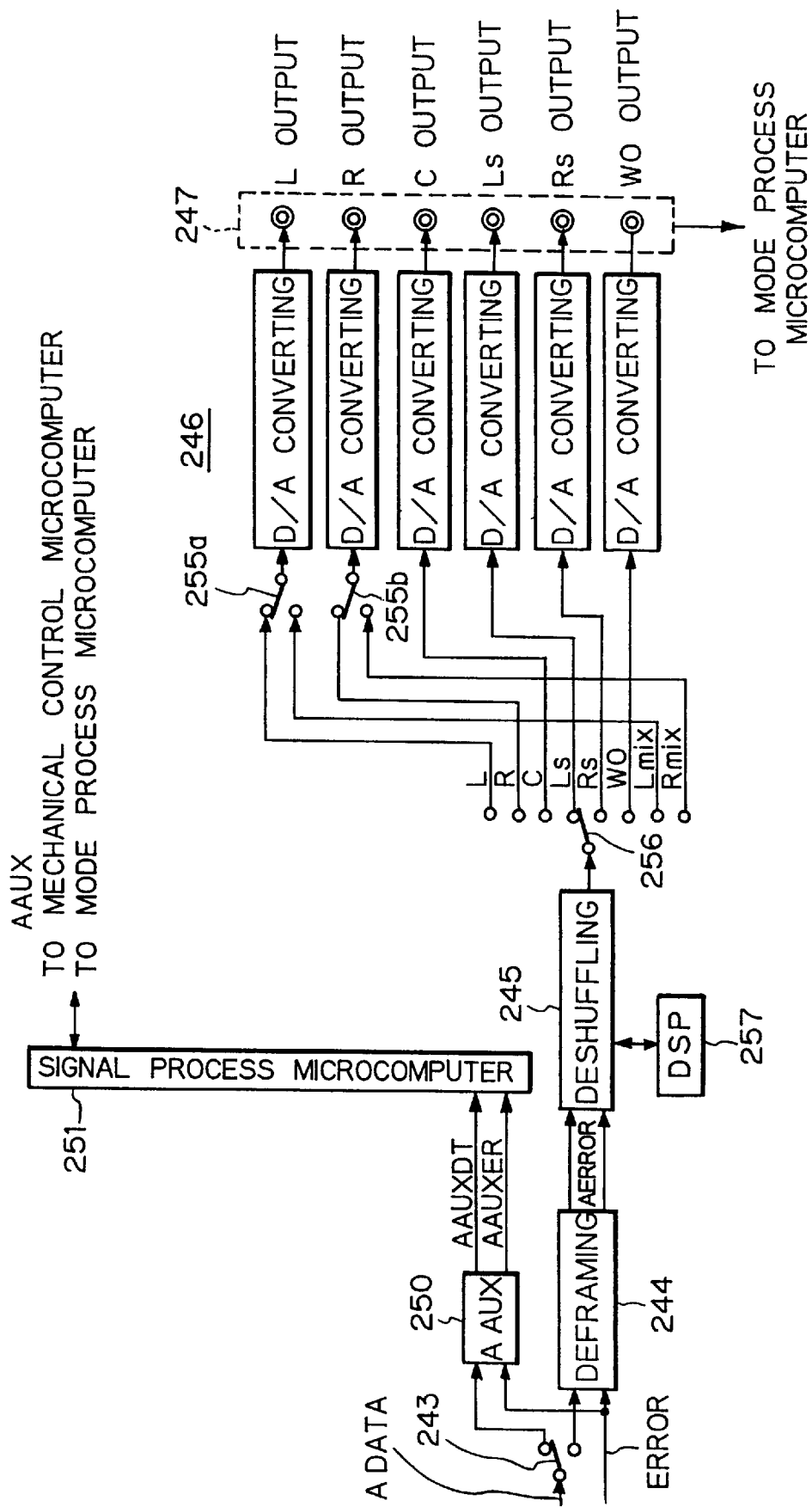
FIG. 34 is a block diagram showing an example of the construction of a reproducing system of the embodiment of the present invention.

FIG. 34 shows a construction of a reproducing system. This drawing shows the audio portion shown in FIGS. 19 and 20. The switch 143, the deframing circuit 144, the deshuffling circuit 145, the D/A converter 146, and the output terminal 147 shown in FIG. 20 are denoted by 243, 244, 245, 246, and 247, respectively, in FIG. 34.

As shown in FIG. 34, the AAUX data collected by the signal process microcomputer 251 (151 in FIG. 20) is supplied to the mode process microcomputer 117. The microcomputer 117 (FIG. 19) receives the connection information from output pin jacks 247. The microcomputer 117 determines a record pattern of audio signals corresponding to the audio mode of the AAUX and supplies signals to output pins through a switch 256. Audio amplifiers and speakers are connected to the output jacks 247. The microcomputer 117 changes the switch position of the switch 256 corresponding to the connection state of the output pin jacks 247 so as to select stereo mix audio signals or multiple-channel stereo signals.

The connection state can be determined in various manners. For example, the pin jacks may have switches. When pin cords are connected to the pin jacks, the switches may be turned on.

The restoration of lost data by inverse calculation is performed by a DSP 257 and inner memory of the deshuffling circuit 25. In this case, since a finite calculating time period is required, the restoration should be slightly delayed in comparison with the case that the lip sync synchronization with the image signal is not restored by the inverse calculation.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A digital audio signal transmission apparatus at a transmitting-side for digitally composing and transmitting audio signals corresponding to a plurality of channels for reproduction by speakers at a reproducing-side, wherein said speakers are arranged in a plurality of speaker layouts, each speaker layout comprising a different positional arrangement of said speakers, wherein each channel is assigned to different audio data representing audio signals of a respective speaker such that each speaker layout is associated with a different combination of audio signals, wherein said audio signals are composed such that upon decomposition the decomposed audio signals are associated with a plurality of speaker layouts, comprising:

converting means for converting the audio data into digitized audio data; and compositing means for generating composite audio data composed of said audio data selected from different channels such that said composite audio data is decomposable into respective audio signals associated with a plurality of different speaker layouts.

2. The apparatus of claim 1, further comprising recording means for recording at said transmitting side the audio data including said composite audio data onto tracks of a recording medium.

3. The apparatus of claim 1 further comprising shuffling means for shuffling an order in which the audio data is to be transmitted.

4. The apparatus of claim 1, further comprising identifying means for identifying the types of audio data transmitted by said channels.

5. The apparatus of claim 4, wherein said identifying means identifies as said types of audio data left, right, center and composite audio data.

6. A digital audio signal transmission apparatus at a transmitting-side for digitally composing and transmitting audio signals corresponding to a plurality of channels for reproduction by speakers at a reproducing-side, wherein said speakers are arranged in a plurality of speaker layouts, each speaker layout comprising a different positional arrangement of said speakers, wherein each channel is assigned to different audio data representing audio signals of a respective speaker position such that each speaker layout is associated with a different combination of audio signals, wherein said audio signals are composed such that upon decomposition the decomposed audio signals are associated with a plurality of speaker layouts, comprising:

converting means for converting the audio data into digitized audio data wherein the converting means varies a sampling rate of said channels thereby changing a data size of each channel; and compositing means for generating composite audio data composed of said audio data selected from different channels such that said composite audio data is decomposable into respective audio signals associated with a plurality of different speaker layouts.

7. The apparatus of claim 6, further comprising control means for selecting the number of channels of audio data to be transmitted.

8. The apparatus of claim 7, wherein the control means further comprise means for reserving the channels along which said composite audio data is transmitted.

9. The apparatus of claim 7, wherein the audio signals are audibly reproducible by an audio system at said reproducing side; and wherein the control means reserves the channels depending upon the speaker positions of the audio system.

10. The apparatus of claim 6, further comprising mode operation selection means for selecting a mode of operation, wherein each mode of operation is assigned a predetermined number of channels; and wherein said converting means sets a sampling rate of said channels dependent on said predetermined number of channels.

11. The apparatus according to claim 10, wherein said mode operation selection means selects a mode of operation for stereo and mono-reproduction of audio signals; wherein a stereo mode of operation is assigned a greater number of channels than a mono-mode of operation.

12. A digital audio signal transmission apparatus at a transmitting-side for digitally composing and transmitting audio signals corresponding to a plurality of channels for reproduction by speakers at a reproducing-side, wherein said speakers are arranged in a plurality of speaker layouts, each speaker layout comprising a different positional arrangement of said speakers, wherein each channel is assigned to different audio data representing audio signals of a respective speaker position such that each speaker layout is associated with a different combination of audio signals, wherein said audio signals are composed such that upon decomposition the decomposed audio signals are associated with a plurality of speaker layouts, comprising:

converting means for converting the audio data into digitized audio data;

compositing means for generating composite audio data composed of said audio data selected from different channels such that said composite audio data is decomposable into respective audio signals associated with a plurality of different speaker layouts; and sampling means for sampling said audio signals to digitize the audio signals, wherein said sampling means samples the audio signals comprising the composite audio data at a higher sampling rate than audio signals which is not composited by said compositing means such that the composite audio data has higher data content than audio data which is not composited by said compositing means.

13. A digital audio signal processing apparatus for processing digitized audio data from a plurality of channels and audibly reproduced by speakers of an audio system arranged in different speaker layouts, each layout arranging said speaker at different speaker positions, wherein said audio data from each channel represents audio signals for a respective speaker position and each speaker layout is associated with a different combination of audio signals, and wherein said audio data includes composite audio data representing a composite of said audio data from different channels for a plurality of speaker layouts, comprising:

means for decomposing said composite audio data according to the speaker positions of said audio system thereby reproducing said audio data from different channels;

means for coupling the audio data in the plurality of channels in a selected sequence to audibly reproduce the analog audio signals on the selected channels by the respective speakers; and control means for controlling said means for decomposing said composite audio data depending upon the speaker positions of the speakers for said plurality of speaker layouts of said audio system to provide different combinations of audio signals depending on the speaker layout.

14. The apparatus of claim 13, wherein the speakers of said audio system are arranged in a spatial relationship with respect to each other for audibly reproducing the audio signals on the plurality of channels from positions determined by the spatial relationship.

15. The apparatus of claim 14, wherein said means for decomposing decomposes the composite audio data corresponding to the spatial relationship of said speakers such that each channel of audio data is audibly reproducible by a different speaker arranged in the spatial relationship.

16. The apparatus of claim 15, wherein the audio system senses said speaker positions connected to the audio system.

17. The apparatus of claim 14, wherein a user assigns particular ones of said speakers to receive the channels of audio data.

18. The apparatus of claim 13, wherein the control means controls said means for decomposing to decompose said composite audio data according to an assignment set by said audio system.

19. The apparatus of claim 13, wherein the composite audio data is composed of scaled audio data of the audio data in at least one of said channels.

20. A digital audio signal processing apparatus for processing digitized audio data from a plurality of channels and audibly reproduced by speakers of an audio system arranged in different speaker layouts, each layout arranging said speaker at different speaker positions, wherein said audio data from each channel represents audio signals for a respective speaker position and each speaker layout is associated with a different combination of audio signals, and wherein said audio data includes composite audio data representing a composite of said audio data from different channels for a plurality of speaker layouts, comprising:

means for decomposing said composite audio data according to the speaker positions of said audio system thereby reproducing said audio data from different channels;

means for coupling the audio data in the plurality of channels in a selected sequence to audibly reproduce the analog audio signals on the selected channels by the respective speakers; and control means for controlling said means for decomposing said composite audio data depending upon the speaker positions of the speakers for said plurality of speaker layouts of said audio system to provide different combinations of audio signals depending on the speaker layout;

wherein composite audio data is sampled at a higher sampling rate than non-composite audio data, further comprising correcting means for correcting audio data that may contain an error using said composite audio data.

21. A digital audio signal processing apparatus for processing digitized audio data from a plurality of channels and audibly reproduced by speakers of an audio system arranged in different speaker layouts, each layout arranging said speaker at different speaker positions, wherein said audio data from each channel represents audio signals for a respective speaker position and each speaker layout is associated with a different combination of audio signals, and wherein said audio data includes composite audio data representing a composite of said audio data from different channels for a plurality of speaker layouts, comprising:

means for decomposing said composite audio data according to the speaker positions of said audio system thereby reproducing said audio data from different channels;

means for coupling the audio data in the plurality of channels in a selected sequence to audibly reproduce the analog audio signals on the selected channels by the respective speakers; and control means for controlling said means for decomposing said composite audio data depending upon the speaker positions of the speakers for said plurality of speaker layouts of said audio system to provide different combinations of audio signals depending on the speaker layout;

wherein the channels of audio data are determined by a sound pitch of the audio signals; and wherein the control means controls said means for decomposing to decompose said composite audio data according to the sound pitch of the audio signals.

22. A digital audio signal transmission apparatus at a transmitting-side for digitally composing and transmitting audio signals corresponding to a plurality of channels for reproduction by speakers at a reproducing-side, wherein said speakers are arranged in a plurality of speaker layouts, each speaker layout comprising a different positional arrangement of said speakers, wherein each channel is assigned to different audio data representing audio signals of a respective speaker position such that each speaker layout is associated with a different combination of audio signals, wherein said audio signals are composed such that upon decomposition the decomposed audio signals are associated with a plurality of speaker layouts, comprising:

converting means for converting the audio data into digitized audio data;

compositing means for generating composite audio data composed of said audio data selected from different channels such that said composite audio data is decomposable into respective audio signals associated with a plurality of different speaker layouts; and identifying means for identifying the types of audio data transmitted by said channels wherein said identifying means identifies as said types of audio data woofer audio data.

* * * * *